United States Patent [19]

Tsunekawa

[11] 4,391,500
[45] Jul. 5, 1983

[54] CAMERA WITH EXPOSURE MEASURING SYSTEM

[75] Inventor: Tokuichi Tsunekawa, Yokohama, Japan

[73] Assignee: Canon Kabushiki Kaisha, Japan

[21] Appl. No.: 323,428

[22] Filed: Nov. 20, 1981

[30] Foreign Application Priority Data

| Nov. 25, 1980 | [JP] | Japan | 55-165550 |
| Nov. 25, 1980 | [JP] | Japan | 55-165551 |
| Nov. 25, 1980 | [JP] | Japan | 55-165552 |
| Nov. 25, 1980 | [JP] | Japan | 55-165559 |
| Nov. 25, 1980 | [JP] | Japan | 55-165560 |
| Feb. 9, 1981 | [JP] | Japan | 56-17819 |

[51] Int. Cl.³ .................. G03B 7/081; G03B 17/20
[52] U.S. Cl. .................................. 354/31; 354/53; 354/60 L; 354/289
[58] Field of Search ............... 354/31 R, 60 R, 53, 354/60 E, 60 L, 289; 250/214 P; 356/221, 222, 226

[56] References Cited

U.S. PATENT DOCUMENTS

| 3,790,275 | 2/1974 | Huboi et al. | 250/214 P X |
| 3,884,584 | 5/1975 | Tsunekawa et al. | 354/60 R X |
| 4,047,187 | 9/1977 | Mashimo et al. | 354/31 X |
| 4,104,655 | 8/1978 | Strauss | 354/60 L X |

FOREIGN PATENT DOCUMENTS 55-52035  4/1980  Japan ........................... 354/31

Primary Examiner—William B. Perkey
Attorney, Agent, or Firm—Toren, McGeady and Stanger

[57] ABSTRACT

A single lens reflex camera having at least first and second light measuring circuits of different light measuring distribution for producing outputs representative of logarithmically compressed information which is a function of the brightness of a scene to be photographed, and a computer for computing the outputs of the first and second measuring circuits. A measuring sensitivity pattern selector is provided outside the camera housing. Upon adjustment of the mixture ratio of the light values, the computer is caused to produce a first output, and the outputs of the first and second light measuring circuits are computed by the aforesaid computer based on a predetermined relationship to produce a second output. When the difference between the first and second computer output falls within a certain range of values, exposure is controlled by the first computer output, and when the output falls out of the certain range of values by the second computer output.

13 Claims, 27 Drawing Figures

CAMERA WITH EXPOSURE MEASURING SYSTEM

BACKGROUND OF THE INVENTION

1. Field of the Invention

This invention relates to a light measuring control system for single lens reflex camera which makes it possible to select a desired sensitivity measuring pattern.

2. Description of the Prior Art

In general, the light measuring systems built into the single lens reflex cameras are to perform either an average measuring function using the light coming from the overall field of view, or a spot measuring function using the light coming from the central part of the viewing field, or a centerweighted measuring function having primary emphasis on the central area of the image.

The average measuring method when applied to a subject of uniform brightness distribution or a subject having small difference between the brightness of the center and surrounding thereof can give a correct exposure.

However, when the brightness of the subject differs greatly from part to part, false readings are produced with the averaged-light measure and one must employ either the spot measure or the centerweighting measure to obtain a proper exposure.

Previously, a system using two photosensitive elements, one which is positioned to detect light from the central part of the whole area of an image on the focusing screen and another which is positioned to detect light from the rest or marginal part of the image was proposed. When the difference between the outputs of both the photosensitive elements, or between the intensities of light is larger than a predetermined level, one of the photosensitive elements is automatically selected by an electronic circuit and connected to an exposure control circuit, and when smaller than the predetermined level, the other element is selected automatically.

Since the conventional system is operated with automatic selection of the average measuring mode and either the spot or the centerweighted measuring mode, depending upon whether or not the subject has an average distribution of light, the expert photographer is unable to fully control the camera setting and thus is not satisfied with the apparatus. Different subject tones require different light measuring modes, making it difficult for beginners to read the corrected exposure because it is necessary to take into account the characteristics of the individual measuring modes.

The conventional method of light measurement in automatic response to a difference in brightnesses of central and marginal areas of an image results in the following problem. Photographic situations where the tones of a scene differ from place to place, may be mainly classified into two cases. In the first case, the scene is light as a whole with the brightest highlight lying particularly at the center. In the second case, the scene is dark over the entire area except in the central area of bright luminance.

The conventional control system for selection of the measuring modes causes setting of the centerweighted, or spot measuring mode in response to these cases. In the first case, good exposure results can be obtained. But, in the second case, an accurate measuring cannot be always assured. For example, in evening and night photography, when a road lamp or a car's head light lies in the central area of the image, with a prior art camera switched to the centerweighted or spot measuring mode, the arrangement of the photosensitive elements lays an extremely heavy emphasis on the street lamp or head light, thus leaving a high possibility of occurrence of not only improper exposure but also an improper exposure that cannot be saved by any later processing.

Furthermore, in the camera provided with the conventional light measuring system, the automatic exposure mode and the manual exposure mode are made selectable. When in the automatic exposure mode, exposure is automatically controlled based on the output of the light measure. In the manual exposure mode, the dislayed reading is taken as a reference and one of the f-stop and shutter-speed combinations for an equivalent exposure is chosen manually.

In the conventional camera, however, when switched to the manual exposure mode, the display of the light value is the same as when in automatic exposure. Therefore, the selected f-stop and shutter-speed combination of the camera must be determined by the experience of the photographer. An inexperienced photographer may read that combination inaccurately and correct exposure cannot be made. This tendency is more pronounced with users who have little experience.

SUMMARY OF THE INVENTION

It is, therefore, a first object of the present invention to achieve the possibility of obtaining proper exposure by the use of first and second light measuring circuits having different light sensing areas in combination with computer means having adjusted operative positions. The outputs of the first and second light measuring circuits are computed to produce a first output, and a fixed operative position where the outputs of the first and second light measuring circuits are computed based on a predetermined relationship to produce a second output. When the differential between the magnitudes of the first and second outputs of the computer means is below a predetermined level, exposure is controlled in accordance with the first output of the computer means. The level exposure is controlled in accordance with the second output of the computer means when the computer means is above the predetermined level.

A second object of the invention is to display light measurement sensitivity in the viewfinder.

A third object of the invention is to present a warning display when a scene to be photographed has a range in brightness that is greater than a predetermined value.

A fourth object of the invention is to provide an exposure measuring system with a mode selector having switched positions for a first mode where the second output of the computer means controls exposure, and for a second mode in which the differential between the magnitudes of the first and second outputs of the computer means is less than the predetermined level, the first output of the computer means controls exposure, and when above the predetermined level, the second output of the computer means controls exposure. The apparatus may also, where necessary, be made switchable up to a position for a third mode where the first output of the computer means controls exposure.

A fifth object of the invention is to provide an arrangement of an average measuring circuit, a spot measuring circuit and a computer circuit for computing the outputs of the average and spot measuring circuit. Either one of the above-described individual circuits may be selected for cooperation with an automatic exposure control system depending upon the object brightness distribution as detected by comparing the outputs of the average and spot measuring circuits with each other.

A sixth object of the invention is to provide the display of an exposure value resulting from the computation of the outputs of the first and second light measuring circuits of different light sensing areas within the finder when in the automatic exposure mode, and the display of two exposure values resulting from the individual outputs of the first and second light measuring circuits respectively within the finder when in the manual exposure mode. A photographer is able to choose one of the f-stop and shutter-speed combinations based on his photographic observation and intelligence.

These and other objects and features of the invention will become apparent from the following description of the embodiments thereof.

DESCRIPTION OF THE PREFERRED EMBODIMENTS

Figure 1:
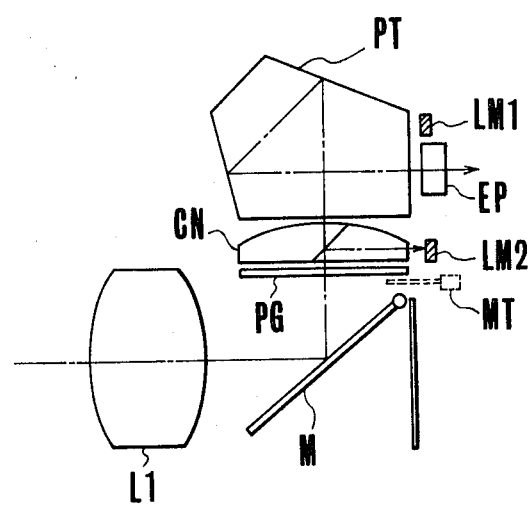
FIG. 1 is a partially schematic vertical section of a camera according to the present invention.
Figure 3A:
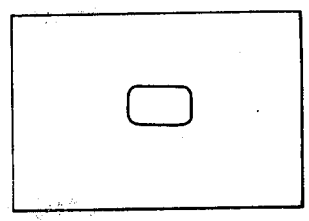
FIGS. 3a, 3b and 3c illustrate the field of view of a finder in the camera of FIG. 1 with FIG. 3a indicating that area of the finder image which the spot measure reads, FIG. 3b that area of the finder image which the average measure reads, and FIG. 3c a centerweighted measure sensitivity pattern.
Figure 3B:
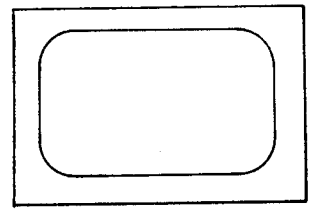

In FIG. 1, there are shown first and second light measuring circuits LM1 and LM2. Each is positioned to detect light from an image of a scene formed on a focusing screen PG by an objective lens L1. The first light measure LM1 is responsive to light radiated from almost the whole area of the image as illustrated in FIG. 3b, and the second light measuring circuit LM2 is responsive to light radiated from a central portion of the area of the image as illustrated in FIG. 3a. M is a quick return mirror; CN is a condenser lens having a half-mirror at a central portion thereof; PT is a pentaprism; and EP is an eyepiece.

A frist embodiment of the present invention is described by reference to FIGS. 1 to 4.

Figure 2:
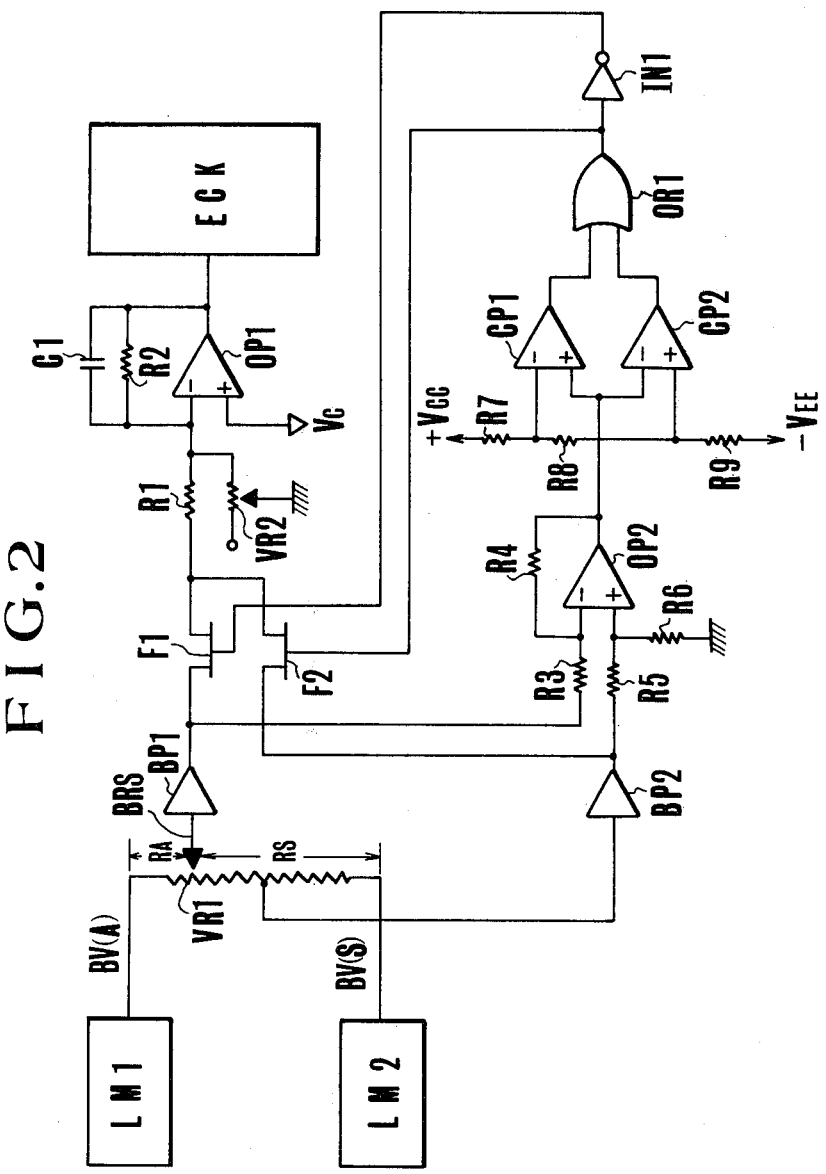
FIG. 2 is a schematic circuit diagram, partly in block form, of a first embodiment of a control circuit of the camera of FIG. 1 according to the present invention.

In FIG. 2, first and second light measuring circuits LM1 and LM2 produce outputs Bv(A) and Bv(S) representing logarithmically compressed information reflecting the brightness of a scene to be photographed. The outputs Bv(A) and Bv(S) are applied to the respective ends of a resistor VR1 with a slider BRS movable on the resistor VR1. The position of a meter sensitivity pattern selector accessible from the outside of the camera housing is adjusted to set a desired pattern thereon. Letting RA and RS denote fractions of the resistance of the resistor VR1 on the LM and LM2 sides of the slider BRS, we have a first computed output Bv(1) appearing at the slider BRS expressed by the following formula $$Bv(1) = Bv(S) + [RS/(RA + RS)][Bv(A) - Bv(S)]$$

For example, when the slider BRS is set at the center of the length of the resistor VR1, then RA=RS. Therefore, the first computed output Bv(1) becomes:

$$Bv(1) = [Bv(A) + Bv(S)]/2$$

Figure 3C:
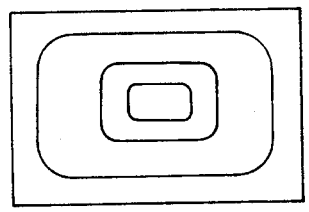

A centerweighted measuring pattern is formed as illustrated in FIG. 3c. When RA>RS, an intermediate measuring pattern between those illustrated in FIGS. 3a and 3c results which may be called a semi-spot measuring. When RA<RS, a semi-average measuring pattern intervening between those of FIGS. 3b and 3c reads the focusing screen.

Next, a second computed output Bv(2) is taken from the center of the length of the resistor VR1 and, therefore becomes:

$$Bv(2)=[Bv(A)+Bv(S)]/2$$

When the first and second outputs of the computer VR1 and BRS differ from each other by more than a predetermined value, the scene to be photographed has a large difference in the brightness distribution over it. Regardless of what measuring pattern has been selected and set on the computer by the photographer, the second output Bv(2) of the computer is automatically selected for cooperation with an exposure control circuit, and the centerweighted measuring is performed to make photographs of standard exposure.

BP1 and BP2 are buffer amplifiers; and OP2 is an operational amplifier constituting a differential amplifier circuit together with resistors R3 to R6. This differential amplifier circuit receives the first and second outputs of the computer through the respective buffer amplifiers BP1 and BP2. Comparators CP1 and CP2 constitute a window-type comparing circuit together with voltage-dividing resistors R7 and R9 which receive the output of the operational amplifier OP2. An OR gate OR1 has two inputs which are connected to the outputs of the comparators CP1 and CP2. OP1 is an operational amplifier; R1 and R2 are computing resistors; C1 is a condenser; and VR2 is an exposure factor setting variable resistor. An analog gate F1 responds to low level output from the OR gate OR1 after an inverter IN1 is turned on, and another analog gate F2 responds to high level output of the turned on OR gate OR1.

It is noted that an exposure value is derived from the logarithmically compressed information of the object brightness Bv sensed by the light measuring circuits LM1, LM2, film sensitivity information Sv and either aperture information Av or shutter time information Tv so as to satisfy the following APEX computation formula $$Bv+Sv=Av+Tv$$

If the aperture information Av is selected as a variable factor, the shutter time is controlled in accordance with the thus obtained exposure value.

Vc is a reference voltage; and Vcc is the voltage of an electrical power source or battery.

The operation of the circuit of such construction is as follows:

The first and second computed outputs Bv(1) and Bv(2) are impedance-converted in passing through the buffer amplifiers BP1 and BP2, and their difference is then taken by the differential amplifier circuit comprising the resistors R3 to R6 and the operational amplifier OP2. When the difference between Bv(1) and Bv(2) exceeds a predetermined level, the output of the OR gate OR1 changes to a high level and analog gate F2 is turned on. Since the high level output signal of the OR gate OR1 is inverted by the inverter IN1 before it is applied to the analog gate F1, the analog gate F1 is turned off. Since such automatic switching causes the analog gate F2 to be turned on, the second computed output Bv(2) is fed through the buffer amplifier BP2 to the exposure value computer OP1 where it is computed with the output of the exposure factor setting resistor VR2 to produce an output representing an exposure value in accordance with the operation of exposure determining means (not shown) is controlled by an exposure control circuit ECK.

When the difference between Bv(1) and Bv(2) is less than a predetermined value, the output of the OR gate OR1 is at a low level and the analog gate F2 comes on and the analog gate F1 turns off. Therefore, the operational output Bv(1) is operated with the information of the exposure setting information resistor VR2 by the operational amplifier OP1 through the buffer amplifier BP1 and the output of the operational amplifier OP1 controls the exposure amount in the exposure amount control circuit ECK.

This embodiment employs, as the second computed output Bv(2), on the basis of a predetermined relationship a mean value of the first and second light value information, a computed value, for example, the square root of the product of the first and second light values, is $$Bv(2) = \sqrt{Bv(A) \times Bv(S)}$$

Figure 4:
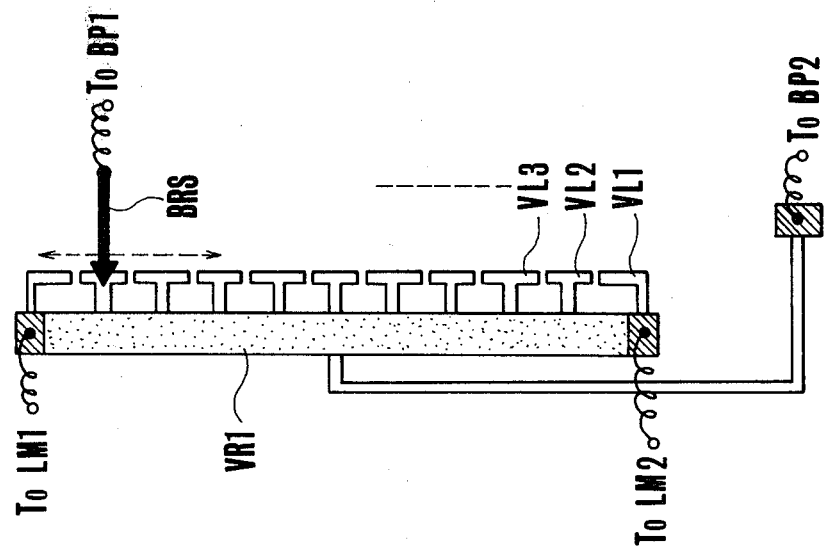
FIG. 4 is a fragmentary sectional schematic view of another example of the computer of FIG. 2.

The measuring pattern setting member of FIG. 2 is a slider on the track of resistance material. Therefore, the repeated use of the computer will cause deterioration of the resistance track. To avoid this, the computer may be modified as illustrated in FIG. 4 where the resistance track VR1 is provided with a great number of abrasion resistance conductors VL, VL2, . . . , on which the slider BRS moves successively, varying the measuring pattern stepwise. It is noted that the control knob for the slider BRS, which has to be accessible from the outside of the camera housing, may be arranged on the common shaft of the film sensitivity setting dial, or that of the shutter speed dial, or may be constructed in the form of a separate member.

The first embodiment of the present invention contemplates the use of at least a first light measuring circuit responsive to a first portion of the area of the finder image, and a second light measuring circuit responsive to a second portion of the area of the finder image in combination with a computer for computing the outputs of the first and second light measuring circuit. Upon adjustment in operative position of the computer by a measuring pattern setting control knob accessible from the outside of the camera housing, a first computed output is produced varying the measuring pattern continuously or stepwise from spot to average measuring, and the outputs of the first and second light measuring circuits are computed by the computer based on a predetermined relationship to produce a second output. When the intensities of light sensed by the first and second light measuring circuits differ from each other by less than a predetermined magnitude, the first computed output is used to determine an exposure setting, and when by more than the predetermined magnitude, the second computed output is used to determine an exposure setting, thus achieving the possibility of always taking photographs of correct exposure.

A second embodiment of the present invention is next described by reference to FIGS. 1 and 5 to 8.

Figure 6A:
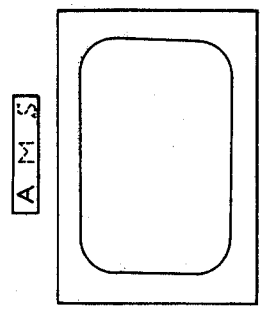
FIGS. 6a, 6b and 6c illustrate the field of view of the finder of FIG. 1 provided with the light measuring mode display of FIG. 5 with 6a indicating that area of the finder image which the spot measure reads, FIG. 6b that area of the finder image which the average measure reads, and FIG. 6c a centerweighted measure sensitivity pattern.
Figure 6B:
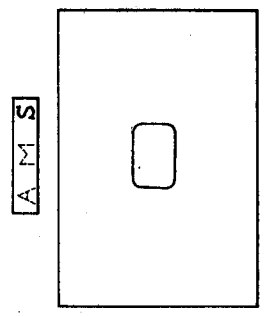
Figure 6C:
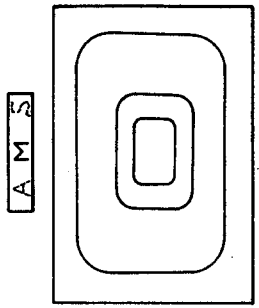
Figure 5:
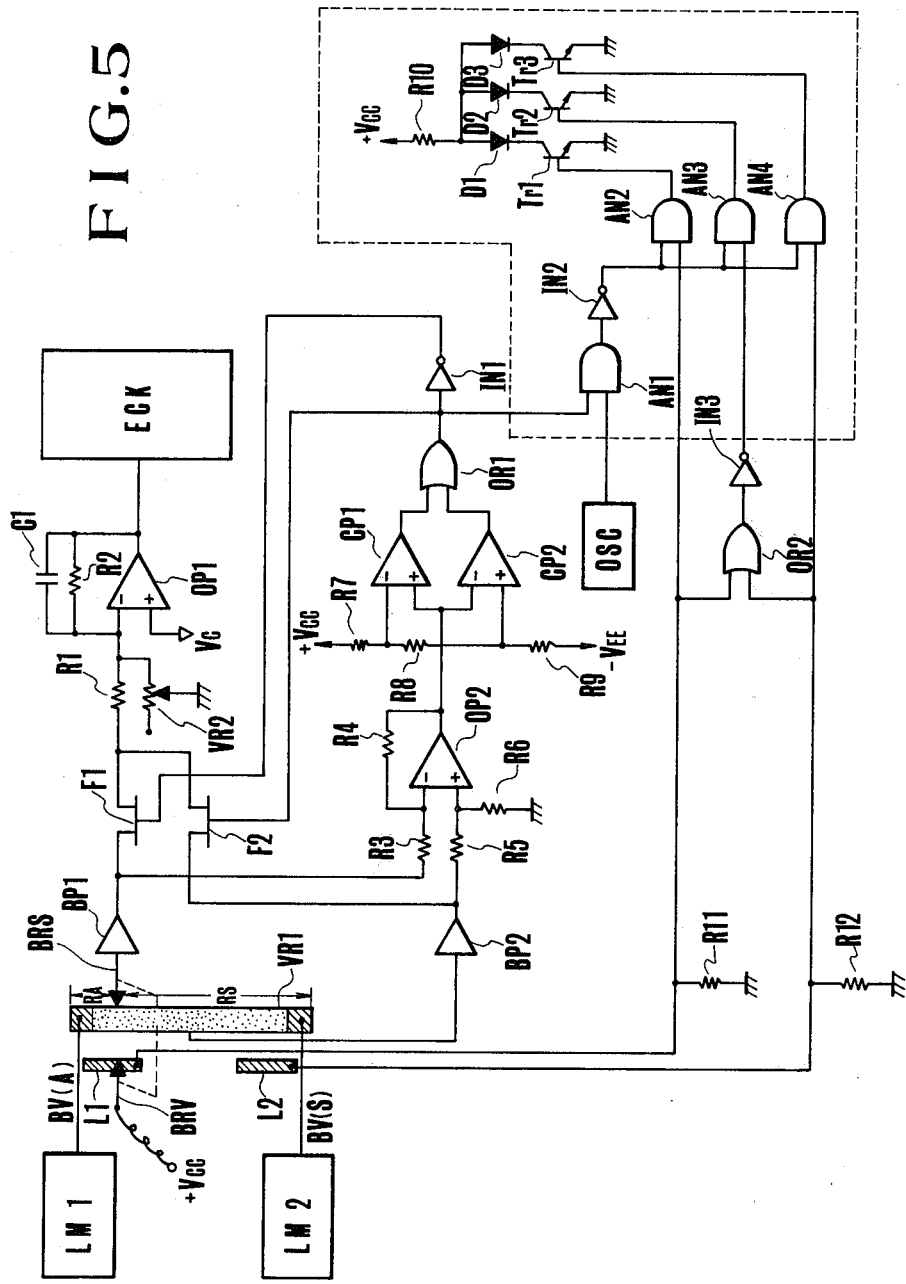
FIG. 5 is a schematic diagram, partly in block form of a second embodiment of the control circuit of the camera of FIG. 1 according to the present invention.

FIG. 5 illustrates a control circuit for use in the camera of FIG. 1, wherein the same reference characters have been employed to denote the respective parts similar to those shown in FIG. 2. FIGS. 6a, 6b and 6c illustrate three different measuring patterns with FIG. 6a indicating a spot-like area of the image to which the second light measuring circuit LM2 is responsive, FIG. 6b indicating an overall field of view light measuring of the light measuring circuit LM1, and FIG. 6c indicating a centerweighted light measuring pattern realized by the outputs of the first and second light measuring circuits through the computer means. In FIGS. 6a to 6c, a selective display of the light measuring modes is presented above the field of view of the finder by light-emitting elements such as LEDs with symbols S, A and M representing the spot measuring mode, average measuring mode and centerweighted measuring mode, respectively.

In FIG. 5, LM1 and LM2 are first and second light measuring circuits for producing outputs representing the logarithmically compressed information Bv(A) and Bv(S) of the brightness of an object to be photographed; VR1 is a resistor connecting the outputs of the first and second light measuring circuits. A slider BRS is moved on the resistor VR1 by a measuring pattern setting member accessible from the outside of the camera housing, whereby a desired measuring pattern can be selected and set. BRV is a measuring mode detecting slider cooperating with electrically conductive patches L1 and L2 and movable in fixed relation with the slider BRS.

Letting RA and RS denote the resistance values of the LM1 and LM2 sides of the slider BRS, respectively, a first output of the computer produced at the slider BRS becomes:

$$Bv(1)=Bv(S)+[RS/(RA+RS)][Bv(A)-Bv(S)]$$

Next, a light value is extracted as a second output of the computer, from the center of the resistor VR1. This light value is expressed by $$Bv(2)=[Bv(A)+BV(S)]/2$$

BP1 and BP2 are buffer amplifiers; OP2 is an operational amplifier constituting a differential amplifier circuit together with resistors R3 to R6. Applied to this operational amplifier OP2 are the first and second computed outputs Bv(1) and Bv(2) through the buffer amplifiers BP1 and BP2, respectively. CP1 and CP2 are comparators constituting a window type comparing circuit together with voltage dividing resistors R7 to R9. Applied to these comparators CP1 and CP2 is the output of the operational amplifier OP2. The outputs of the comparators CP1 and CP2 are applied to an OR gate OR1; OP1 is an operational amplifier; R1 and R2 are computing resistors; C1 is a condenser; VR2 is an exposure factor setting resistor; F1 is an analog gate which is turned on inverted low level output from an inverter IN1 is applied from the OR gate OR1; F2 is an analog gate which is turned on when high level output of the OR gate OR1 is applied. It is noted that an exposure determination is made on the basis of the following APEX formula: where Bv is the logarithmically compressed information of the object brightness sensed by the light measuring circuits; Sv is the film sensitivity information; Av is the aperture information; and Tv is the shutter time information. This exposure determination is then reflected by automatic control of the shutter time or diaphragm aperture. D1, D2 and D3 are indicator elements, for example, light-emitting diodes, for indicating respective measuring modes, the D1 displaying an "A" representing the average measuring mode, the D2 displaying an "M" representing the center-weighted measuring mode and the D3 displaying an "S" representing the spot measuring mode. Tr1, Tr2 and Tr3 are transistors for controlling the light-emitting operation of the indicator elements D1, D2 and D3, respectively, AN2, AN3 and AN4 are AND gates controlling the ON and OFF operation of the transistors Tr1, Tr2 and Tr3; AN1 is an AND gate to which the output of the OR gate OR1 and a pulse train from an oscillator OSC are applied and of which output is applied through an inverter IN2 to the AND gates AN2, AN3 and AN4. The conductor path L1, when bearing on the slider BRV applies the battery voltage Vcc to an OR gate OR2 and the AND gate AN2. Also, the conductor patch L2, when bearing on the slider BRV applies the battery voltage Vcc to the OR gate OR2 and the AND gate AN1. The output of the OR gate OR2 is applied through an inverter IN3 to the AND gate AN3. R10, R11 and R12 are resistors. Vc is a reference voltage.

The operation of the circuit of such construction is as follows: The first and second outputs of the computer are impedance-converted in passing through the buffer amplifiers BP1 and BP2, and the difference between the Bv(1) and Bv(2) is taken by the differential amplifier circuit comprising the resistors R3 to R6 and the operational amplifier OP2, when the difference between the Bv(1) and Bv(2) is larger than a predetermined value, as sensed by the window-type comparing circuit comprising the resistors R7 to R9 and the comparators CP1 and CP2, the output of the OR gate OR1 takes a high level, and when smaller than the value, the output of the OR gate OR1 takes a low level.

Assuming that the computer slider BRS and the display control slider BRV are set in the illustrated position of FIG. 5 by the measuring pattern setting member (not shown) where the measuring mode display control slider BRV rides on the average measuring mode sensor L1, a signal of high level appears at one input of both the OR gate OR2 and AND gate AN2. When the difference between the Bv(1) and Bv(2) is smaller than the predetermined value, the output of the OR gate OR1 is of low level and the output signal of the oscillator OSC is gated off by the AND gate AN1, leaving the output of the inverter IN2 at a high level. Therefore, the AND gate AN2 is at a high level and the signal from the AND gate AN2 is applied to the transistor Tr1, turning on the transistor Tr1 and supplying power to the light-emitting element D1 to display a letter "A", as illustrated in FIG. 6b. When the difference between the Bv(1) and Bv(2) is larger than the predetermined amount, the OR gate OR1 produces a high output. In response, the AND gate AN1 passes the pulse train from the oscillator OSC to the inverter IN2. The pulse train from the inverter IN2 is then applied to the AND gate AN2 so that the light-emitting element is on and off intermittently, thus warning the photographer that the selected measuring pattern is not suited for accurate measuring because the brightness of the object to be photographed has a great range.

Alternatively, assuming that the measuring mode display control slider BRV is moved to the opposite or spot measuring mode sensor L2 and the computer slider BRS is also moved in the opposite position to that of FIG. 5, a high level signal is then applied to the OR gate OR2 and AND gate AN4 at one of their inputs. When the difference between the Bv(1) and Bv(2) is smaller than the predetermined value, the OR gate OR1 produces a low output, causing the AND gate AN1 to block the output signal of the oscillator OSC. The AND gate AN4 thus has a high level output which is applied to the transistor Tr3, to thereby turn on the transistor Tr3. A light-emitting element D3 is supplied with power to present a display letter "S", as illustrated in FIG. 6a. When the difference between the Bv(1) and Bv(2) is larger than the predetermined value, the OR gate OR1 produces a high output. Therefore, the output of the AND gate AN1 oscillates in response to the pulse train from the oscillator OSC. This oscillating output of the AND gate AN1 is applied through the inverter IN2 to the AND gate AN4, and the light-emitting element D3 is intermittently supplied with power, thus presenting a warning display that the measuring pattern selected by the photographer is not suited for the given situation because the distribution of the object brightness is so great.

The photographer then moves the measuring pattern setting member to an intermediate position where the mode display control slider BRV is taken out of contact with both of the sensors L1 and L2, and the computer slider BRS is also at the corresponding location. Then, both of the inputs of OR gate OR2 and one of the inputs of the AND gates AN2 and AN4 becomes low. Therefore, the inverter IN3 produces a high output, causing only the AND gate AN3 to have a high output. Then, the transistor Tr2 is turned on and the light-emitting element D2 is supplied with power either continuously or intermittently to present a display of letter "M" as illustrated in FIG. 6c, indicating that the center-weighted measuring pattern is selected and set.

In this embodiment, the exposure determination is made based on either the Bv(1) or the Bv(2) as follows: When the difference between the Bv(1) and Bv(2) is smaller than the predetermined value, the analog gate F1 is turned on to feed the exposure value computer of resistors R1 and R2 and VR2 and operational amplifier OP1 with the Bv(1) information. The output of the exposure value computer is applied to the exposure control circuit ECK which sets a proper f-stop-and-shutter-speed combination. When the difference between the Bv(1) and Bv(2) is larger than the predetermined value, the opposite analog gate F2 is turned on to feed the exposure value computer with the Bv(2) information. Responsive to the output of the exposure value computer, the exposure control circuit ECK sets a proper f-stop-and-shutter-speed combination.

Figure 7:
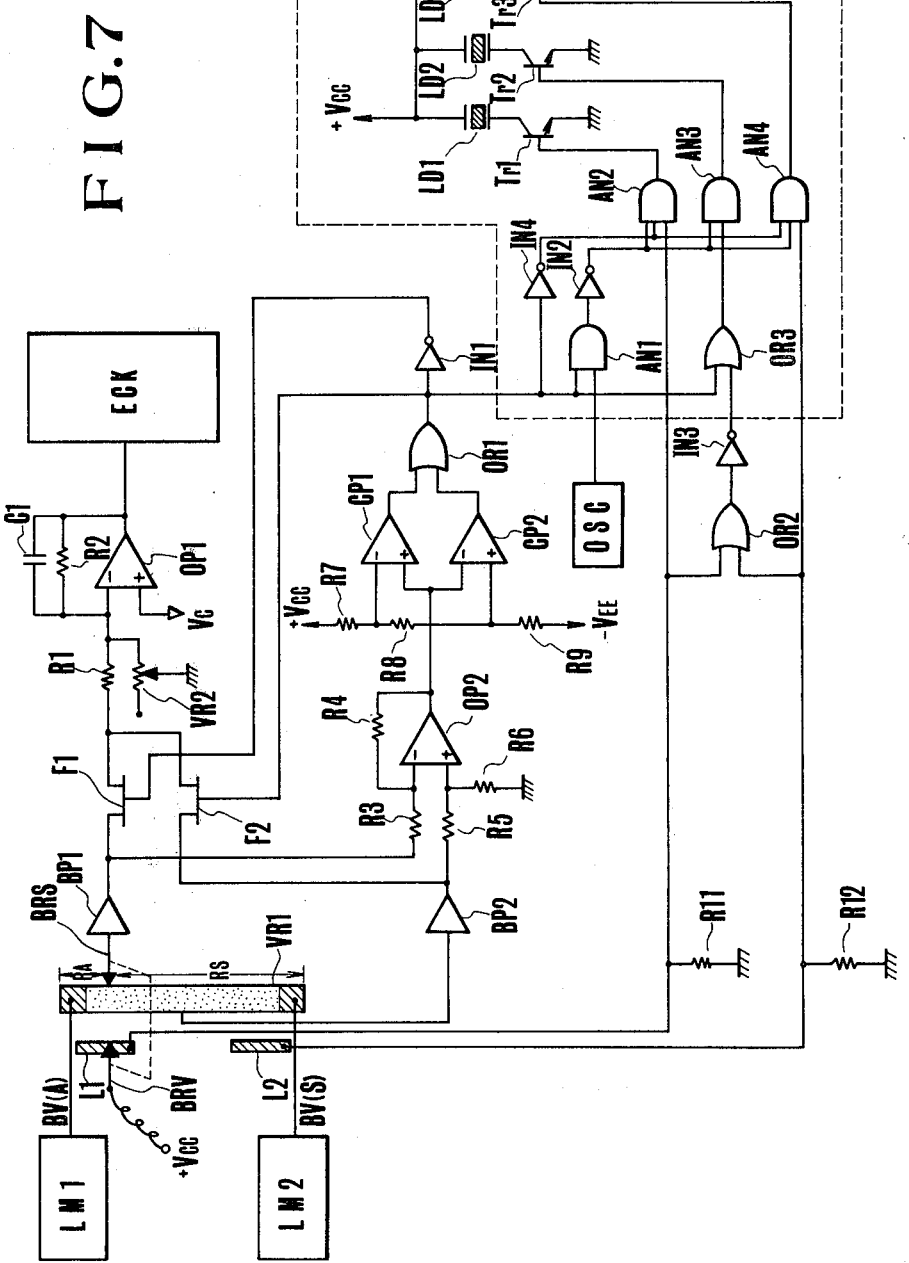
FIG. 7 is a schematic diagram, partly in block form, of another example of the control circuit of FIG. 5.

FIG. 7 illustrates another example of the measuring mode display control circuit within the dashed line block of FIG. 5.

Figure 8:
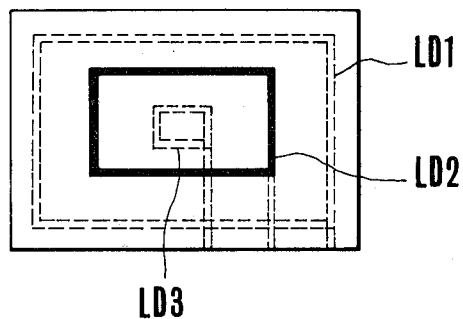
FIG. 8 is a plan view illustrating the relative positions of the display elements of FIG. 7 on the focusing screen.

In this example, when the difference between the Bv(1) and Bv(2) is larger than the predetermined value, it results in that regardless of what measuring pattern has been selected by the photographer, the display of the centerweighted measuring mode corresponding to the second output of the light value computer is automatically selected. Instead of using the light-emitting elements, it is preferred to use liquid crystal elements LD1, LD2 and LD3, shaped as illustrated in FIG. 8 on the focusing screen or condenser lens. That is, the display element LD1 indicates the average measuring mode, the LD2 the centerweighted measuring mode, and the LD3 the spot measuring mode. It is noted that since the liquid crystal is not a light-emitting elements, its positioning in the optical path of the finder produces little influence on the light measuring circuits.

The outputs of the inverter IN3 and OR gate OR1 are routed through an OR gate OR3 to the AND gate AN3. Also, the output of OR gate OR1 is routed through an inverter IN4 to the AND gates AN2 and AN4.

The operation is as follows:

Assuming that the photographer moves the measuring pattern setting member to set the display control slider BRV and computer slider BRS in the positions illustrated in FIG. 7 where the display control slider BRV is in contact with the average measuring mode sensor L1, then the OR gate OR2 and AND gate AN2 are each supplied at one input with a signal of high level. Where the differential between Bv(1) and Bv(2) is smaller than the predetermined value, the OR gate OR1 produces a low level, causing the output signal of the oscillator OSC not to pass through the AND gate AN1. Therefore, the output of the inverter IN2 remains high. Since the output of the inverter IN4 is high, the AND gate AN2 is high and the high signal from the AND gate AN2 is applied to the transistor TR1, thereby the transistor Tr1 is turned on to actuate the liquid crystal display element LD1. Thus, the area of the finder image which the average measuring pattern reads is displayed.

In another case where the difference between the Bv(1) and Bv(2) is larger than the predetermined value, the output of the OR gate OR1 changes to a high level. Therefore, the signal of high level from the OR gate OR1 is applied through the OR gate OR3 to the AND gate AN3 and, at the same time, to gate on the AND gate AN1. The pulse train from the oscillator OSC is passed through the AND gate AN1, inverter IN2 and AND gate AN3 to the liquid crystal display element LD2, thereby an intermittent display of the center-weighted measuring mode is presented. Thus, the photographer is warned that the object to be photographed has so large a difference in brightness distribution that the selection of the average measuring mode is improper. At this time, the display of the average measuring mode is not presented.

Assuming that the measuring mode display control slider BRV is in contact with the spot measuring mode sensor L2, and the computer slider BRS in unison with the slider BRV is positioned in the opposite terminal end to that illustrated in FIG. 7, then the OR gate OR2 and AND gate AN4 are supplied with a signal of high level at one of their inputs. Where the difference between the Bv(1) and Bv(2) is smaller than the predetermined value, the output of the OR gate OR1 is of low level, and therefore the output signal from the oscillator OSC does not pass through the AND gate AN1, causing the output of the inverter IN2 to remain at a high level. Since the output of the inverter IN4 is high, the AND gate AN4 has a high output which is applied to the transcript Tr3. Accordingly, the transistor Tr3 is turned on to actuate the liquid crystal display element LD3, thus displaying the area of the finder image which the spot measuring pattern reads.

In another case where the difference between the Bv(1) and Bv(2) is larger than the predetermined value, the OR gate OR1 changes its output to high level. Therefore, the AND gate AN3 is gated on, and at the same time the AND gate AN1 oscillates in response to the train of pulses from the oscillator OSC. Since this oscillating output of the AND gate AN1 is applied through the inverter IN2 to the AND gate AN3, the output of the AND gate AN3 oscillates. This actuates the liquid crystal display element LD2 intermittently to warn the photographer that the object intended to be photographed has so large a difference in the brightness distribution that the selection of the spot measuring mode is not suitable. At this time, the display of the spot measuring mode is not presented.

The measuring pattern setting member is in an intermediate position when the slider BRV is taken out of contact with both of the sensors L1 and L2. With this setting, both of the inputs of the OR gate OR2 and one of the inputs of the AND gates AN2 and AN4 become low. Therefore, the output of the inverter IN3 becomes high, causing the AND gate AN3 to produce a signal of high level or a pulse train, depending upon the high, or oscillating output of the inverter IN2. Thus, the liquid crystal display element LD2 is energized continuously or intermittently to display the centerweighted light measuring pattern.

It is noted in FIG. 7 that where the difference between the Bv(1) and Bv(2) is smaller than the predetermined value, the analog gate F1 is turned on so that the information of Bv(1) is computed with the preset exposure factory information on the resistor VR2 by the exposure value computer of the resistors R1 and R2 and operational amplifier OP1. The output of the operational amplifier OP1 controls exposure by the exposure control circuit ECK. On the other hand, when the difference between the Bv(1) and Bv(2) is larger than the predetermined value, the analog gate F2 is turned on so that the information of Bv(2) is computed with the preset exposure factor information on the resistor VR2 by the exposure value computer. Then, the output of the operational amplifier OP1 controls exposure by the exposure control circuit ECK.

According to the second embodiment of the present invention, the camera can be operated with the selection of the various light measuring modes, and is provided with means for displaying what light measuring mode has been set. This means also functions to indicate that the set measuring mode is different from the selected one, because the latter is not suited for accurate measuring in the given photographic situation. Therefore, the photographer can always take correctly exposed photographs. Furthermore, since the area of the finder image which the selected measuring pattern reads can be indicated within the finder, even a beginner can easily understand what measuring mode has been set in the camera and the measuring aspect to which the camera is responsive.

A third embodiment of the present invention is described by reference to FIGS. 1 and 9 to 11.

Figure 9:
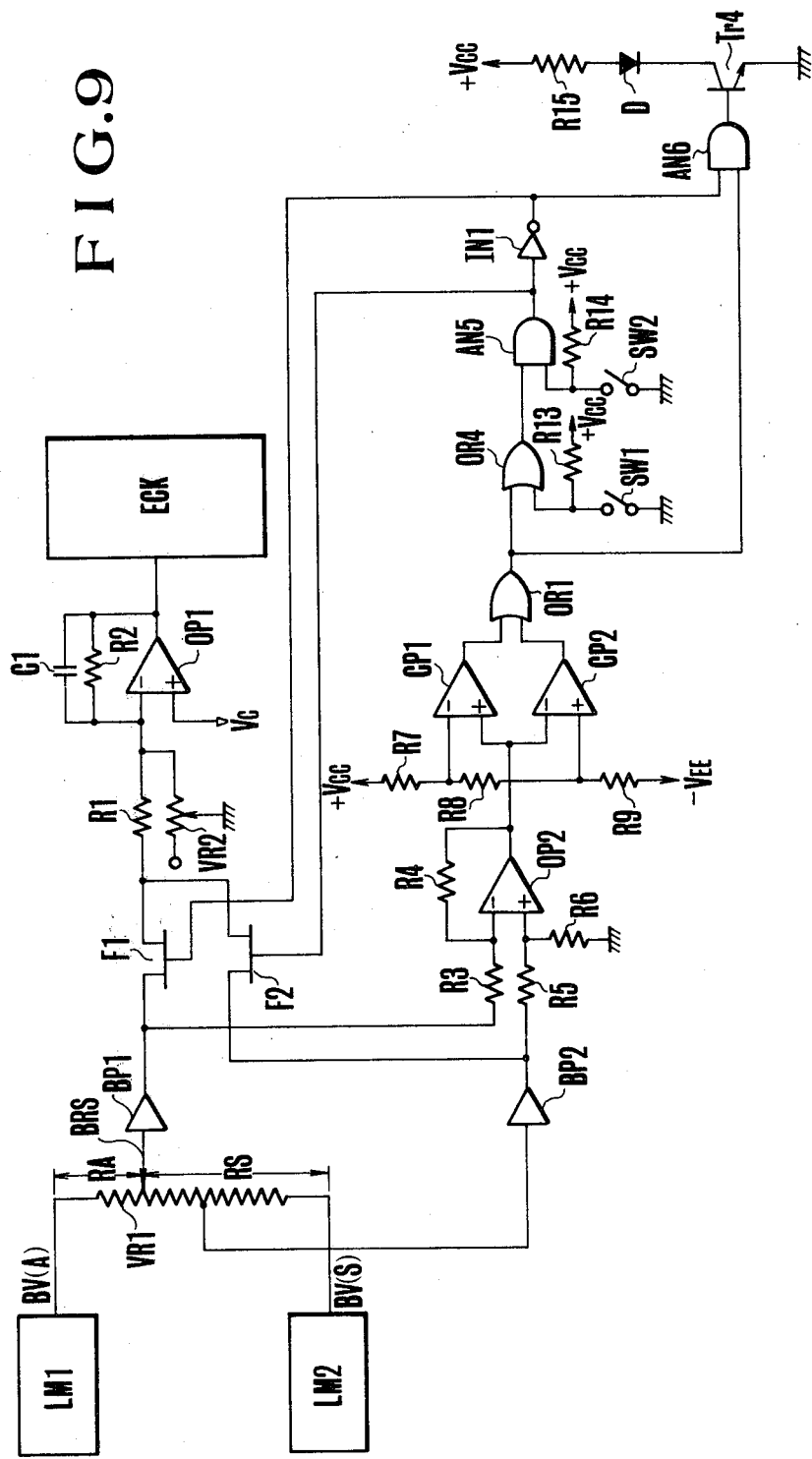
FIG. 9 is a schematic view, partly in block form, of a third embodiment of the control circuit of the camera of FIG. 1 according to the present invention.

FIG. 9 illustrates a control circuit for use in the camera of FIG. 1 where the same reference characters have been employed to denote parts similar to those shown in FIG. 3.

Figure 10A:
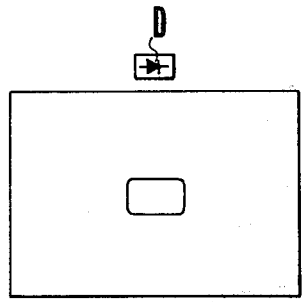
FIGS. 10a, 10b and 10c illustrate the field of view of the finder of FIG. 1 provided with the display portion of FIG. 9, with FIG. 10a indicating that area of the finder image which the spot measure reads, FIG. 10b that area of the finder image which the average measure reads, and FIG. 10c a centerweighted measure sensitivity pattern.
Figure 10B:
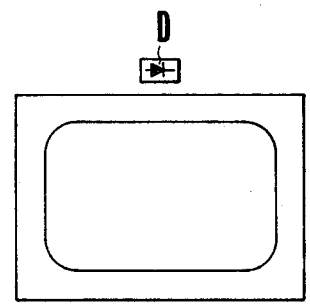
Figure 10C:
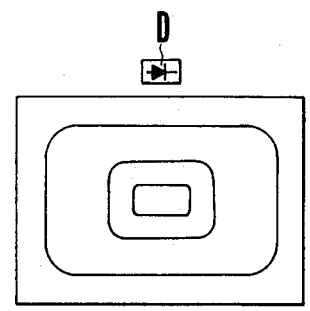

FIGS. 10a, 10b and 10c illustrate three different measuring patterns. FIG. 10a indicates a central portion of the area of the finder image to which the second light measuring circuit LM2 is responsive, FIG. 10b indicates the whole area of the finder image to which the first light measuring circuit LM1 is responsive, and FIG. 10c illustrates a centerweighted measuring pattern realized by combining the outputs of the first and second light measuring circuits LM1 and LM2 through a computer. In these FIGS. 10a, 10b, and 10c, a display by a light-emitting element D1 is provided just above the field of view of the finder in order to warn the photographer when the first and second outputs of the light value computer differ from each other by more than a predetermined value.

In FIG. 9, LM1 and LM2 are first and second light measuring circuits for producing outputs Bv(A) and Bv(S) representing the logarithmically compressed information of the brightness of an object to be photographed; VR1 is a resistance track connecting the outputs of the first and second light measuring circuits LM1 and LM2. A slider BRS moves on the resistance track VR1. By adjusting the position of the slider BRS by a light measuring pattern setting member accessible from the outside of the camera housing, a desired measuring pattern can be selected and set.

The light value computer VR1 and BRS produce a first output Bv(1) appearing at the slider BRS and defined by $$Bv(1) = Bv(S) + [RS/(RA+RB)][Bv(A) - Bv(S)]$$

where RA and RB are the resistance values of the parts of the track VR1 which lie on the LM1 and LM2 sides of the slider BRS respectively.

As a second output of the computer, the resistance track VR1 is tapped out, for example, at the center. From this, $$Bv(2) = [Bv(A) + Bv(S)]/2$$

BP1 and BP2 are buffer amplifiers; OP2 is an operational amplifier constituting a differential amplifier circuit together with resistors R3 to R6; CP1 and CP2 are comparators constituting a window type comparing circuit together with voltage-dividing resistors R7 to R9; OR1 is an OR gate. A light metering mode changeover circuit is constructed from an OR gate OR4, an AND gate AN5, an inverter IN1, resistors R13 and R14, and changeover switches SW1 and SW2. The changeover switches SW1 and SW2 are operated by a mode control member SL2 accessible from the outside of the camera housing. F1 and F2 are analog gates; OP1 is an operational amplifier; R1 and R2 are computing resistors; C1 is a condenser; VR2 is an exposure factor setting information resistor; ECK is an exposure control circuit. It is noted that an exposure determination is made by computing the logarithmically compressed information of the object brightness sensed by the light measuring circuits, film sensitivity information Sv and aperture information Av or shutter time information Tv on the basis of the following APEX formula:

$$Bv + Sv = Av + Tv$$

This exposure determination is reflected to control the shutter time or the size of the diaphragm aperture.

AN6 is an AND gate; Tr4 is a transistor; D is a light-emitting element such as a light-emitting diode; and 15 is a resistor.

Figure 11:
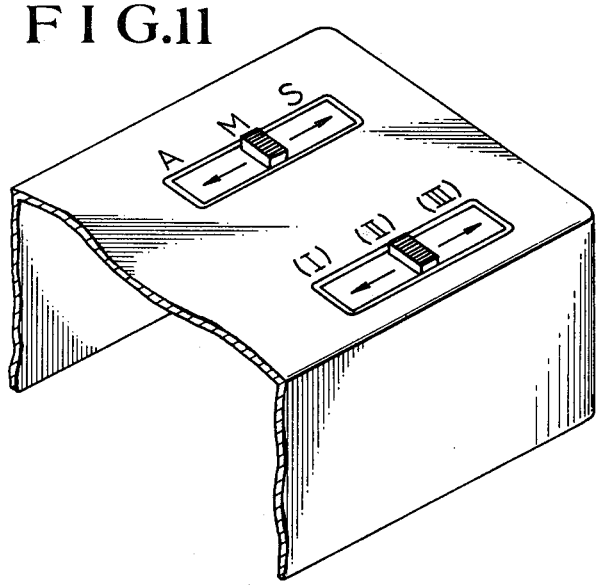
FIG. 11 is a fragmentary perspective view illustrating an arrangement of a measuring mode selector knob and a control knob for the variable resistor of FIG. 9.

FIG. 11 illustrates an example of an arrangement of a light measuring pattern setting member and a measuring mode setting member. SL1 is the light measuring pattern setting member which cooperates with the computer slide BRS and has three switched positions A for the average measurement, M for the centerweighted measurement and S for the spot measurement.

SL2 is the light measuring mode setting member which controls the operation of the switches SW1 and SW2 in accordance with selection of modes (I), (II) and (III).

Operation of the circuit of this construction is described as follows: The mode changeover member is disposed in the centerweighted measuring mode or the first mode, the mode changeover member SL2 is set in (I) mode, the changeover switches SW1 and SW2 are both turned off, thereby the output of AND gate AN5 is changed to a high level independent of what output is produced from the OR gate OR1. Therefore, the analog gate F2 is gated on to select the second output Bv(2) of the computer for computation with the preset exposure factor on the resistor VR2 by the operational amplifier OP1 and resistors R1 and R2. The output of the operational amplifier OP1 controls the exposure by the exposure control circuit ECK.

In the first mode, the centerweighted measuring is performed no matter what position may be taken by the light measuring pattern setting member SL1. This set measuring pattern is illustrated in FIG. 10c.

Next, explanation is given to the case of the mode changeover member being disposed in the second or measuring pattern discriminating mode.

With the measuring pattern setting member SL1 set in, for example, (A) position where the first output Bv(1) of the computer is almost equal to the output of the first measuring circuit LM1 for the average measuring pattern, when the mode changeover member SL2 is set in (II) mode position, the changeover switch SW1 is turned on, and the changeover switch SW2 is turned off. Therefore, whether or not the measuring pattern selected by the photographer is appropriate, discrimination depends upon the output of the OR gate OR1.

In more detail, the first and second outputs Bv(1) and Bv(2) of the computer are impedance-converted in passing through the buffer amplifiers BP1 and BP2 respectively, and then compared with each other by the differential amplifier circuit of the resistors R3 to R6 and operational amplifier OP2 to find a difference between the Bv(1) and Bv(2). When the difference between the Bv(1) and Bv(2) is larger than a predetermined value sensed by the window-type comparing circuit of the voltage dividing resistors R7 to R9 and comparators CP1 and CP2, the output of the OR gate OR1 is at a high level, and when smaller than the predetermined value, the output of the OR gate OR1 is changed to a low level.

If there is a small difference between the Bv(1) and Bv(2), the output of the OR gate OR1 is low, the AND gate AN5 produces an output of low level. The low level signal from the AND gate AN5 is applied through the inverter IN1 to turn on the analog gate F1. Therefore, the exposure determination is made based on the first output Bv(1) of the light value computer. The concurrent measuring pattern is illustrated in FIG. 10b. Conversely, when the difference between the Bv(1) and Bv(2) is larger than the predetermined value, the output of the OR gate OR1 is at a high level. Therefore, the AND gate AN5 produces a high output level. The high level signal from the AND gate AN5 is applied to turn on the analog gate F2. Therefore, in this case, the exposure determination is made based on the second output Bv(2) of the light value computer.

When the mode changeover member is set in the third or manual mode position and when the measuring pattern setting member SL1 is set, for example, in (S) position where the first output Bv(1) of the light value computer is almost equal to the output Bv(S) of the second light measuring circuit LM2, and the mode changeover member SL2 is set in (III) mode position, the changeover switch SW1 is left alone, and the changeover switch SW2 is turned on. The AND gate AN5 produces a low level output. The low level signal from the AND gate AN5 is applied through the inverter IN1 to turn on the analog gate F1. Therefore, with the measuring pattern selected and set by the photographer, in this instance, the spot measuring pattern illustrated in FIG. 10a reads the focusing screen, and the output of the spot measuring circuit LM2 serves as the first output Bv(1) of the computer in making the exposure determination.

It should be pointed out that when the light value information, set by the photographer, or the first output of the computer differs from the intermediate light value information or the second output of the computer by more than the predetermined value, the transistor Tr4 is turned on through the AND gate AN6. The light-emitting element D is energized to warn the photographer.

In the third embodiment of the invention, the camera can be selectively operated in a wide variety of light measuring modes including the automatic and manual ones by combining the switched positions of the light measuring mode changeover member and the light measuring pattern setting member, according to the observation and intelligence of the photographer. Moreover, it is possible to take the best photographs at the level of ability which the photographer has attained. Beginners may use (I) mode, semi-experts (II) mode and professionals (III) mode.

A fourth embodiment of the invention is described by reference to FIGS. 1 and 12 to 14.

Figure 12:
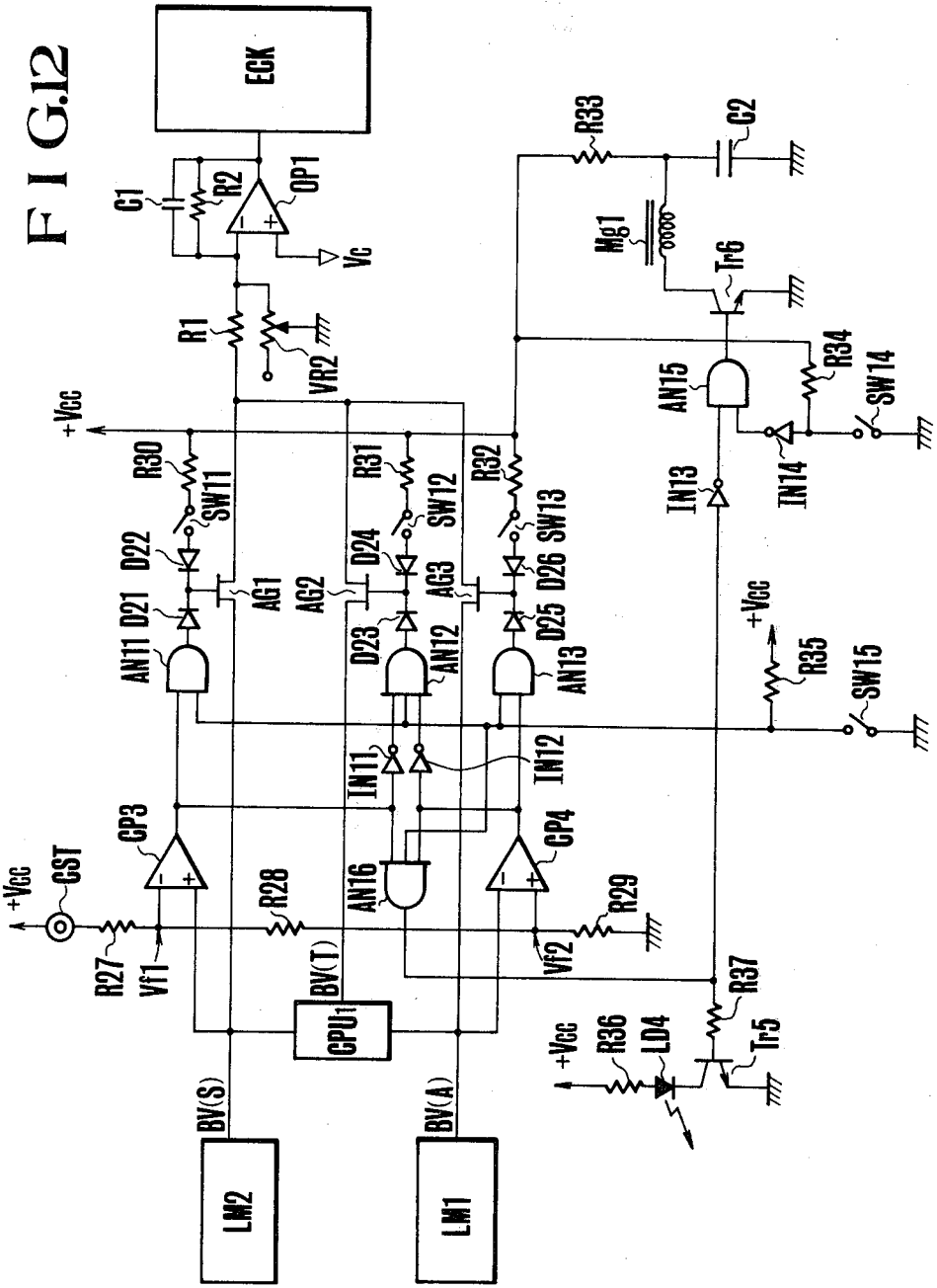
FIG. 12 is a schematic view, partly in block diagram form, of a fourth embodiment of the control circuit of the camera of FIG. 1 according to the present invention.

FIG. 12 illustrates a control circuit for use in the camera of FIG. 1 wherein the same reference characters have been employed to denote the parts similar to those shown in FIG. 3.

Figure 13A:
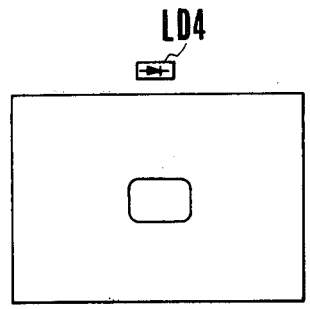
FIGS. 13a, b and c illustrate the field of view of the finder in the camera of FIG. 1 provided with a display portion of FIG. 12, with FIG. 13a indicating that area of the finder image which the spot measure reads, FIG. 13b that area of the finder image which the average measure reads, and FIG. 13c a centerweighted measure pattern.
Figure 13B:
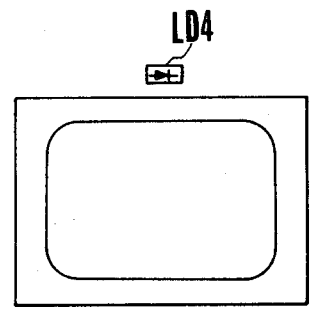
Figure 13C:
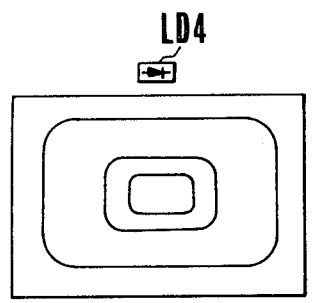

FIGS. 13a, 13b and 13c illustrate three different measuring patterns, FIG. 13a indicates a spot-like portion of the area of the finder image to which a second light measuring circuit LM2 is responsive, FIG. 13b indicates substantially the whole area of the image to which a first light measuring circuit LM1 is responsive, and FIG. 13c illustrates a centerweighted measuring pattern utilizing the outputs of the first and second light measuring circuits through computing means. In these FIGS. 13a, 13b and 13c, LD4 denotes a warning display by a light-emitting element such as LED, in which an image appears just above the field of view in the finder. When an object to be photographed has such a complicated distribution of brightness that a manual change of the measuring pattern is required, the photographer is warned.

In FIG. 12, LM1 and LM2 are average and spot measuring circuits for producing outputs Bv(A) and Bv(S) representing the logarithmically compressed data relating to the brightness of an object to be photographed. CPU1 is a computer circuit for computing the Bv(A) and Bv(S) to produce an output Bv(T) representing a centerweighted measuring pattern.

Bv(T) may be defined by, for example, $$Bv(T) = \frac{Bv(A) + Bv(S)}{2}, \text{ or } Bv(T) = \sqrt{Bv(A) \times Bv(S)}.$$

Resistors R27, R28, R29, and a constant current source CST form a reference voltage generating circuit for producing first and second reference voltages Vf1 and Vf2 where Vf1 > Vf2.

CP3 is a comparator for comparing Bv(S) with Vf1, and CP3 is a comparator for comparing Bv(A) with Vf2; OP1 is an operational amplifier; R1, R2 are computing resistors; C1 is a condenser; VR2 is an exposure factor setting resistor; and ECK is an exposure control circuit. It is noted that an exposure determination is made by computing the logarithmically compressed information of the object brightness Bv sensed with the light measuring circuits, film sensitivity information Sv, and aperture information Av or shutter time information Tv on the basis of the following ABEX formula:

$$Bv+Sv=Av+Tv$$

This exposure determination is utilized to control the shutter time or the size of diaphragm aperture.

AG1, AG2 and AG3 are analog gates for input control of Bv(S), Bv(T) and Bv(A) to the operational amplifier OP1; AN11, AN12 and AN13 are AND gates for controlling the opening and closing operation of the analog gates AG1, AG2 and AG3; SW11, SW12 and SW13 are manually operable switches. These switches SW11, SW12 and SW13 open and close the analog gates AG1, AG2 and AG3; D21 to D26 are diodes; R30 to R32 are resistors; and IN11 and IN12 are inverters.

LD4 is a light-emitting element for a warning display; Tr5 is a transistor for controlling energization of the element LD4; R36 and R37 are resistors; AN16 is an AND gate; SW15 is a switch having automatic and manual positions; R35 is a resistor; SW14 is a shutter release switch forming a shutter release circuit together with inverters IN13, IN14, an AND gate AN15, a transistor Tr6, a magnet Mg1, resistors R33 and R34 is a condenser C2; Vc is a reference voltage; and Vcc is the voltage of an electrical power source or battery.

Figure 14:
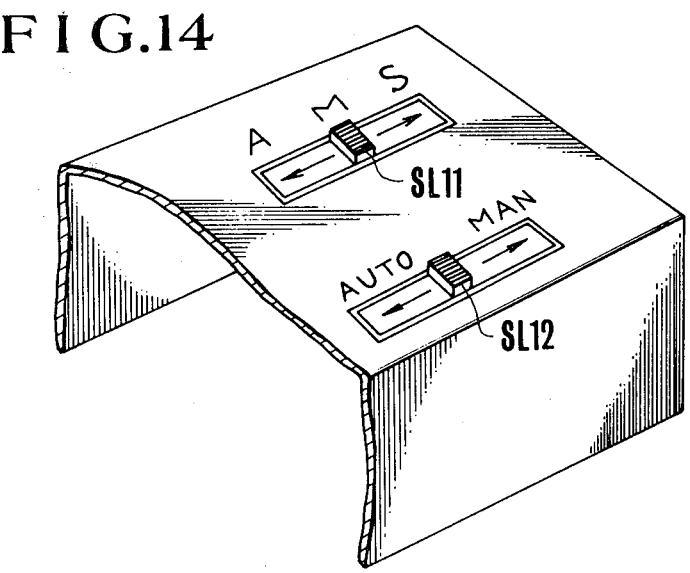
FIG. 14 is a fragmentary perspective view illustrating an arrangement of control knobs for the switches of FIG. 12.

FIG. 14 illustrates an arrangement of a light measuring pattern setting member SL11 and a light measuring pattern changeover member SL12 on the upper panel of the camera housing. The changeover member SL12 controls the opening and closing operation of the switch SW15 in such a manner that it is opened in Auto position and closed in manual position. The setting member SL11, when placed in registry with an index S, turns on the switch SW11 to set a spot measuring mode, when registered with index M, turns on the switch SW12 to set a centerweighted measuring mode, and when registered with index A, turns on the switch SW13 to set an average measuring mode. It is noted that the average measuring circuit may have a low sensitivity to a central part of the area of the finder image and have a high sensitivity to the marginal part of the area of the image, that is, performs a marginweighted measurement.

The operation of the circuit of such a construction is as follows: The changeover member SL12 is first assumed to be in Auto position where an automatic change in measuring mode is effected.

Where a scene to be photographed is light over the whole angular field and, in addition, very bright highlights lie in the central part, for example, an outdoor scene in daylight is to be shot from an indoor room through a window, it is preferable to measure the intensity of light only in the central part of the area of the finder image. Otherwise, an inaccurate measurement will result. In this case, Bv(S)>Vf1 and Bv(A)>Vf2. Since the comparator CP3 produces a high level output and the comparator CP4 produces a low level output, the AND gate AN11 produces a high level output. This high level signal from the AND gate AN11 is applied through the diode D21 to turn on the analog switch AG1. The output of the spot measuring circuit, or Bv(S) information is computed with the preset exposure factor set on the resistor VR2 by the computing resistors R1 and R2 and operational amplifier OP1. Responsive to the output of the operational amplifier OP1, the exposure control circuit ECK operates exposure determining means (not shown) provided that the release switch SW14 is closed to energize the magnet Mg1. The concurrent measuring pattern is similar to that illustrated in FIG. 13a.

Where the brightnesses of the central and marginal parts of a scene to be photographed are both moderate, as Bv(S)<Vf1 and Bv(A)>Vf2, the outputs of the comparators CP3 and CP4 are both of a low level. Responsive to the high level outputs from the inverters IN11 and IN12, the AND gate AN12 produces a high level output signal which is then applied through the diode D23 to turn on the analog gate AG2. The output Bv(T) of the computer circuit CPU1, representing the centerweighted measuring information, is applied to the operational amplifier OP1. When the release switch SW14 is closed to energize the magnet Mg1, the exposure control circuit ECK controls exposure in accordance with the output of the operational amplifier OP1. The concurrent measuring pattern is like that illustrated in FIG. 13c.

When shooting a dark scene over the whole angular field, for example, a night scene, because of a high possibility of including spot light sources, an inaccurate measuring will often result. It is preferable to operate the camera in the average measuring mode. In this case, Bv(S)>Vf1 and Bv(A)<Vf2, the output of the comparator CP3 is of low level, and the output of the comparator CP4 changes to high level. Responsive to this, the AND gate AN13 produces an output signal of a high level which is applied through the diode D25 to turn on the analog gate AG3. The output of the average measuring circuit representing Bv(A) information is selected for computation of an exposure value. Then, when the release switch SW14 is closed to energize the magnet Mg1, the circuit ECK controls exposure in accordance with the output of the operational amplifier OP1. The concurrent measuring pattern is similar to that illustrated in FIG. 13b.

To shoot a scene with a very bright highlight at the center in a very dark surrounding, such as in a theatrical performance, Bv(S)>Vf1 and Bv(A)<Vf2, the outputs of the comparators CP3 and CP4 are both at a high level, and, therefore, the AND gate AN16 produces a high level output signal. Responsive to this signal, the transistors Tr5 is turned on to energize the light-emitting element LD4, thus warning the photographer of an inaccurate measurement. At the same time, the high level signal from the AND gate AN16, after having been inverted by the inverter IN13, is applied to the AND gate 15. Therefore, even when the release switch SW14 is in the closed position, the AND gate AN15 cannot produce a high level output signal, and the magnet Mg1 is no longer energized, thus prohibiting actuation of an exposure control. Therefore, actuation of a camera release is prohibited.

In this case, the operator has to move the changeover member SL12 to the manual position, where the release prohibition is removed, as will be understood from the following description.

When the changeover member SL12 is set in the MANUAL position, the changeover switch SW15 is turned on, changing all the outputs of the AND gates AN11, AN12, AN13 and AN14 to a low level. Therefore, the AND gate AN15 may then produce a high level output signal depending upon the closure of the release switch SW14. Thus, release actuation is possible. In other words, the release prohibition is taken out.

When the setting member SL11 is turned in registry with the index S, the switch SW11 is turned on, causing the analog gate AG1 to be turned on. Therefore, the Bv(S) signal is applied to the operational amplifier OP1. Thus, the camera is operated in the spot measuring mode.

Also, when the setting member S11 is placed in registry with the index M, the switch SW12 is turned on, causing the analog gate AG2 to be turned on. Therefore, the Bv(T) signal is applied to the operational amplifier OP1. Thus, the camera is operated in the center-weighted measuring mode.

When the setting member SL11 is placed in registry with the index A, the switch SW13 is turned on, causing the analog gate AG3 to turn on. Therefore, the Bv(A) signal is applied to the operational amplifier OP1. Thus, the camera is operated in the average measuring mode.

According to the fourth embodiment of the present invention, even the brightness range in the whole area of the finder image is taken into account in controlling the selection of the measuring mode. Therefore, in all photographic situations which may be encountered, no matter how complicated the subject tones are, and what range of brightness the scene has, it is always possible to obtain a correct exposure.

A fifth embodiment of the present invention is described by reference to FIGS. 1, 15 and 16.

Figure 15:
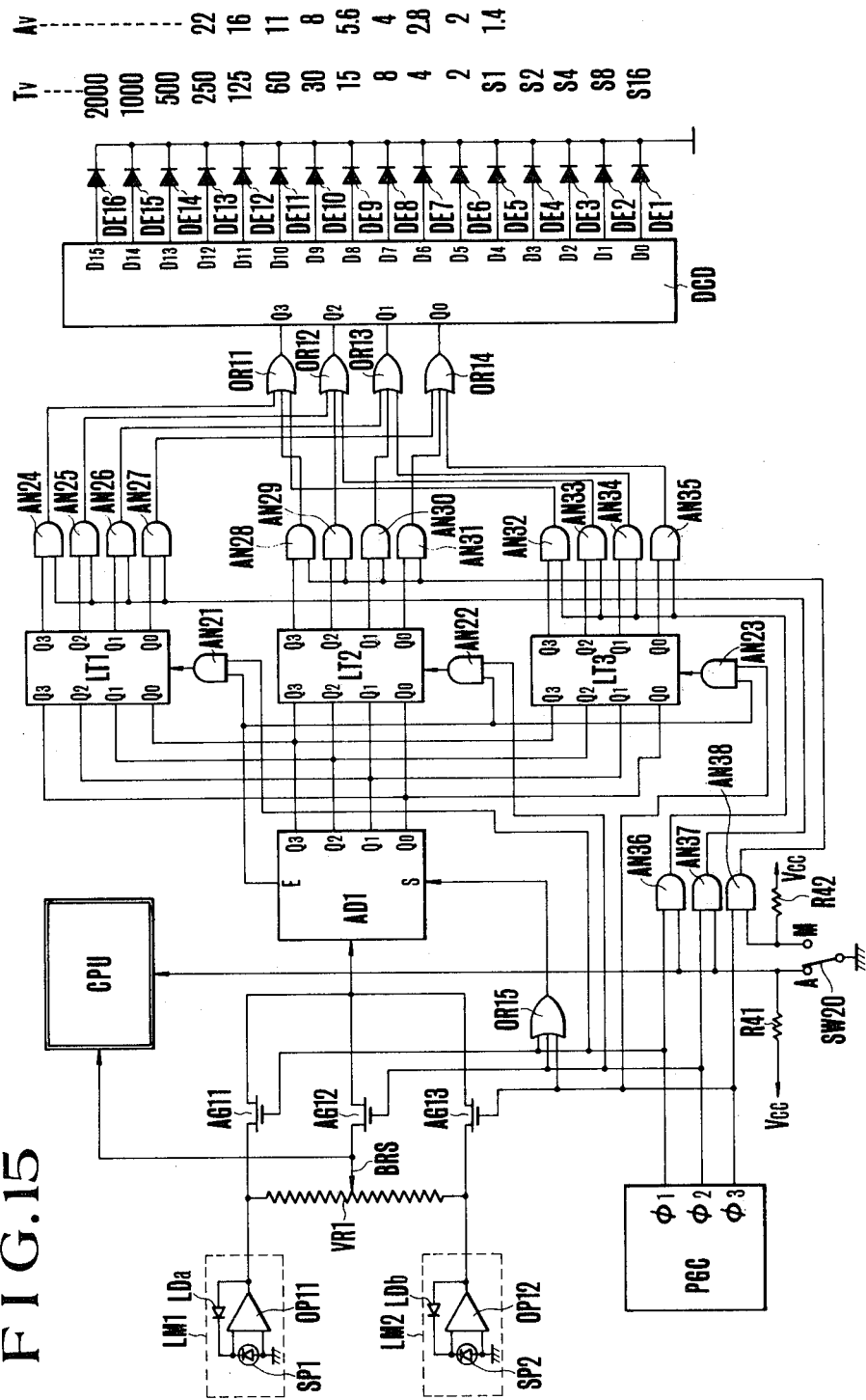
FIG. 15 is a schematic view, partly in block form, of a fifth embodiment of the control circuit of the camera of FIG. 1 according to the present invention.

FIG. 15 illustrates a control circuit for use in the camera of FIG. 1. In FIG. 15, LM1 is a first light measuring circuit having an averge or centerweighted sensitivity pattern and is constructed from a photo-electric transducer element SP1, a logarithmic conversion diode LDa and an operational amplifier OP11; LM2 is a second light measuring circuit having a spot-like sensitivity pattern and is constructed from a photo-electric transducer element SP1, a logarithmic conversion diode LDb and an operational amplifier OP12. The outputs of these first and second light measuring circuits LM1 and LM2 are computed by a computing registor VR1. The computing result appears at a slider BRS and is transmitted therefrom to an automatic exposure control circuit CPU, whereby an automatic exposure control is carried out based on the computed light value. AG11, AG12 and AG13 are analog gates; AD1 is an A/D converter to which the output of the aforesaid first light measuring circuit LM1, the output of the computing resistor VR1 at the slider BRS, and the output of the second light measuring circuit LM2 are applied through the analog gates AG11, AG12 and AG13, respectively; PGC is a pulse generating circuit for producing pulses $\phi1$, $\phi2$ and $\phi3$ having timing as illustrated in FIG. 16. These timing pulses $\phi1$, $\phi2$ and $\phi3$ are applied to the gating control inputs of the analog gates AG11, AG12 and AG13 in this order of generation, thereby the analog gates AG11, AG12 and AG13 are turned on and off successively. Again, the pulses $\phi1$, $\phi2$ and $\phi3$ are applied through an OR gate OR15 to an S terminal of the A/D converter AD1. Therefore, the A/D converter initiates an analog-to-digital converting operation in synchronism with the leading edge of each pulse, and terminates the analog-to-digital converting operation within a one pulse duration. LT1, LT2 and LT3 are latch circuits, each has output states Q0, Q1, Q2 and Q3 which are connected to the output states Q0, Q1, Q2 and Q3 of the A/D converter AD1, respectively; AN21, AN22 and AN23 are AND gates for giving off latch signals which are applied to the latch circuits LT1, LT2 and LT3. These AND gates AN21, AN22 and AN23 are connected at one of their inputs to an E terminal of the A/D converter AD1, where a pulse appears representing the termination of the analog-to-digital converting operation, the opposite inputs are receptive of the pulses $\phi1$, $\phi2$ and $\phi3$, respectively. AN24 to AN35 and OR11 to OR 14 are gates for changing over the display of measured readings. When in automatic and manual exposure modes, three groups of AND gates AN24 to AN27, AN28 to AN31 and AN32 to AN35 are connected at one of their inputs in each group to the output states Q3, Q2, Q1 and Q0 of the latch circuits LT1, LT2 and LT3, respectively. The OR gates OR11, OR12, OR13 and OR14 each have three inputs, one of which is connected to the output of the corresponding AND gate AN24 to AN27, AN28 to AN31 and AN32 to AN35 in each group. DCD is a decoder having inputs Q3, Q2, Q1 and Q0 which are connected to the outputs of the OR gates OR11, OR12, OR13 and OR14, respectively, and have output terminals D1, D2, ... D15 which are connected to the anodes of light-emitting diodes DE1, DE2, ..., DE16 which have their cathodes grounded. The light-emitting diodes DE1, DE2, ..., DE16 are positioned in relation to values on the shutter time and aperture scales in the manner shown in FIG. 15. SW20 is a changeover switch for selection of the automatic and manual exposure modes, the movable contact of this changeover switch SW20 being connected to the circuit ground. A fixed contact A is connected through a resistor R41 to a battery Vcc, and another fixed contact M is connected through a resistor R42 to the battery Vcc. The fixed contact A is also connected to the automatic exposure control circuit CPU so that when the fixed contact A is grounded, the automatic exposure control circuit CPU is rendered operative. AN36, AN37 and AN38 are AND gates to an input to which is applied the pulses $\phi1$, $\phi2$ and $\phi3$, respectively. The AND gates AN36 and AN37 are also each connected at the other input to the fixed contact A, and the AND gate AN38 is connected at its other input to the fixed contact M. The outputs of the AND gates An36, AN37 and AN38 are applied to the respective groups of AND gates AN24 to AN27, AN28 to AN31 and AN32 to AN35.

Figure 16:
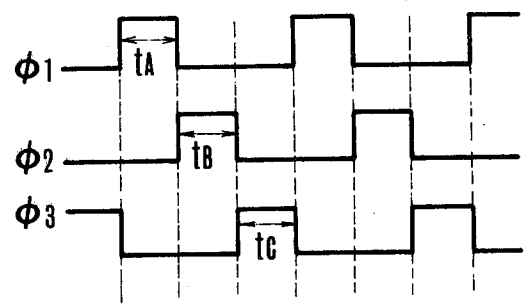
FIG. 16 is a pulse timing chart of the output of the pulse generator of FIG. 15.

The operation of this circuit is as follows:

When a power switch (not shown) is thrown, the pulse generating circuit PGC produces timing pulse trains $\phi1$, $\phi2$ and $\phi3$ illustrated in FIG. 16, by which the analog gates AG11, AG12 and AG13 are turned on in sequence, so that the output of the first light measuring circuit LM1, the output of the computing resistor VR1 with the slider BRS, and the output of the second light measuring circuit LM2 are transmitted to the A/D converter AD1 in time-displaced relation, where they are converted to digital values. The A/D converter AD1 is fed at its S terminal with the pulses $\phi1$ to $\phi3$ in such timed relation, as illustrated in FIG. 16, through the OR gate OR15. Therefore, in synchronism with the leading edge of each pulse, an analog-to-digital converting operation is initiated. Within the period (tA, tB, or tC) of any one pulse train, the analog-to-digital converting operation is terminated. When the termination of the analog-to-digital converting operation is reached, a signal appears at the E terminal of the converter AD1. Responsive to this signal, one of the latch circuits LT1 to LT3, depending upon the timing pulses $\phi1$, $\phi2$ and $\phi3$, latches the outputs Q0 to Q3 of the A/D converter AD1 representing the corresponding one of the digital values of the outputs of the first measuring circuit, computer and second measuring circuit, as the corresponding one of the AND gates AN21 to AN23 is gated on.

Assuming that the automatic exposure mode is selected and set on the changeover switch SW20 with its movable contact in contact with the fixed contact A, the AND gates AN36 and AN37 do not perform an "and" operation, and the AND gates AN38 performs an "and" operation. Therefore, while the outputs of the AND gates AN24 to AN27 and AN32 to AN35 are low, the AND gates AN28 to AN31 only allow for the output from the latch circuit LT2 to pass therethrough to the OR gates OR11 to OR14 in synchronism with the clock pulse $\phi3$. Then, the decoder DCD selectively energizes one of the light-emitting elements DE1 to DE16 which reads an exposure setting on the shutter speed or diaphragm aperture scale.

Otherwise, when the changeover switch SW20 is in the manual exposure mode position where the movable contact is in contact with the fixed contact M, the AND gates AN36 and AN37 perform an "and" operation, and the AND gate AN38 does not perform an "and" operation. Therefore, the outputs of the AND gate AN28 to AN31 change to a low level, and the first and third groups of AND gates AN24 to AN27 and AN32 to AN35 alternately allow for the outputs of the latch circuit LT1 and LT3 to pass therethrough to the OR gates OR11 to OR14 in synchronism with the clock pulses $\phi1$ and $\phi3$, respectively. Then, the decoder DCD selectively energizes the two of the light-emitting didodes DE1 to DE16 which read exposure settings based on the outputs of the first and second light measuring circuits on the shutter speed of diaphragm aperture scale respectively in time-displaced relation to each other. It is noted that, when in the manual exposure mode, the automatic exposure control circuit CPU is rendered inoperative by the switch SW20.

According to the previously described fifth embodiment of the present invention, in the automatic exposure mode the exposure setting is determined based on the computed output of the first and second light measuring circuits and is displayed in digital form within the finder and exposure is automatically controlled in accordance with that computed output. When in the manual exposure mode, the average measuring reading (or center-weighting) based on the output of the first light measuring circuit and the spot measuring reading based on the output of the second light measuring circuit are alternately displayed within the finder. Thus, the photographer who needs to take different kinds of light measuring readings in photographic situations, where the right exposure can only be found by experience, has an appropriate measuring approach which solves such exposure problems as the camera is switched from the automatic to the manual exposure mode, where not only the average measuring reading but also the spot measuring reading is displayed.

A sixth embodiment of the present invention is described by reference to FIGS. 1, 17, 18a, and 18b. In this embodiment, an ammeter MT for exposure information display, is arranged as illustrated by dashed lines in FIG. 1.

Figure 18A:
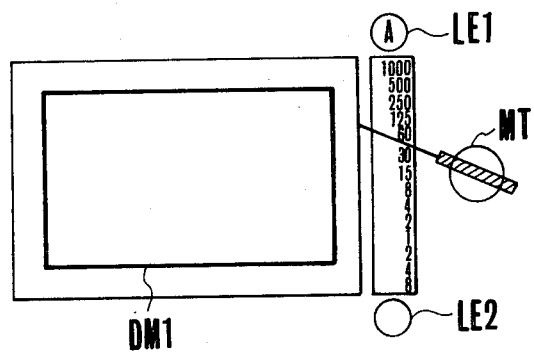
FIGS. 18a and 18b illustrate the field of view of the finder in the camera of FIG. 1 provided with the display portions of FIG. 17 with FIG. 18a indicating that area of the finder image which the average measure reads, as displayed along with the exposure measure, and FIG. 18b that area of the finder image which the spot measure reads as displayed along with the exposure measure.
Figure 17:
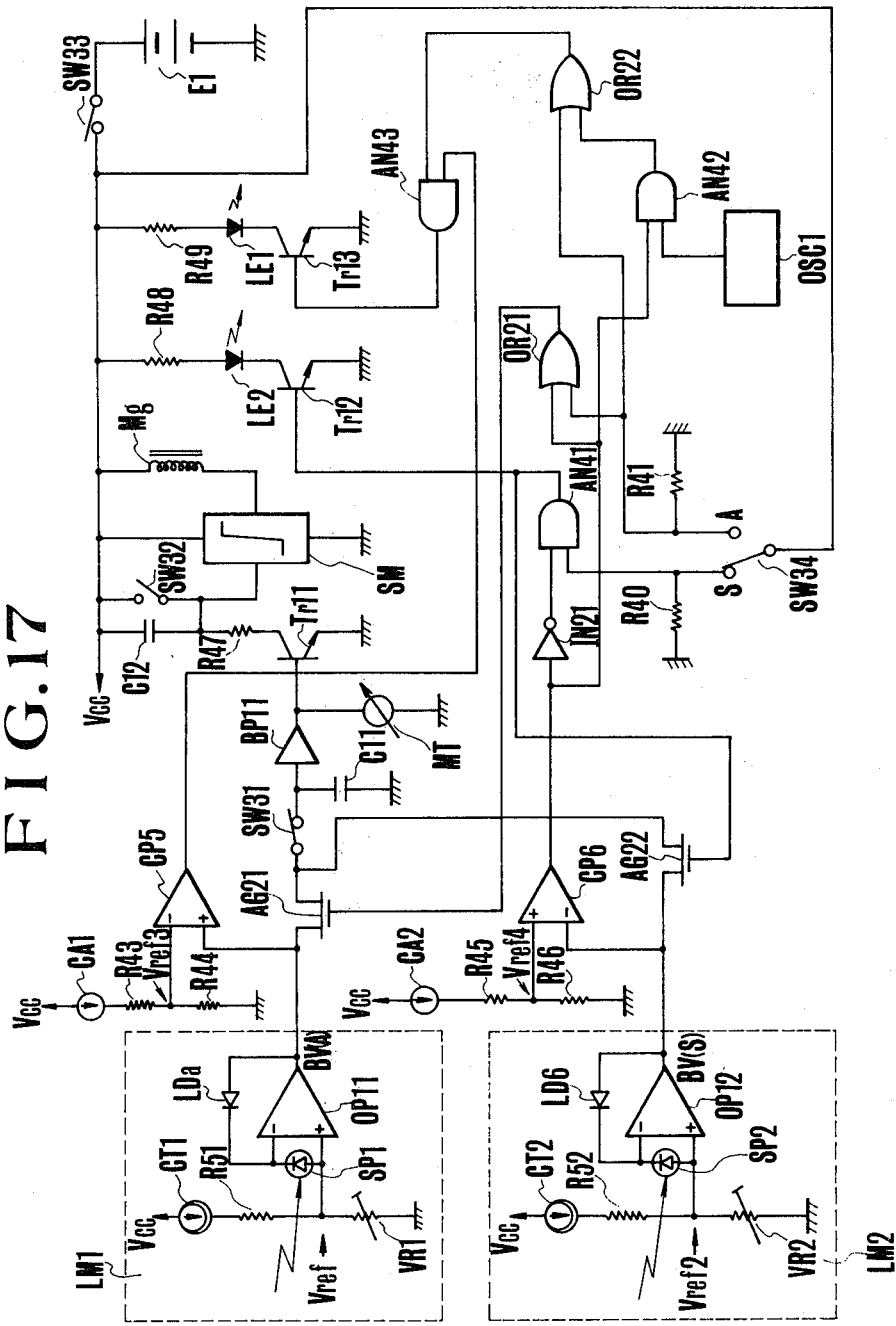
FIG. 17 is a schematic view of a sixth embodiment of the control circuit of the camera of FIG. 1 according to the present invention.

FIG. 17 is a control circuit for use in the camera of FIG. 1. FIG. 18a indicates that part DM1 of the area of the finder image to which an average measuring circuit LM1 is responsive, and FIG. 18b indicates that part DM2 of the area of the image which a spot measuring circuit LM2 is responsive to. In these FIGS. 18a and 18b, LE1 denotes a light-emitting diode as a display means for the average measurement, and LE2 denotes a light-emitting diode as a display means for the spot measurement. MT denotes an ammeter cooperating with a shutter speed scale.

In FIG. 17, LM1 and LM2 are average and spot measuring circuits for producing the outputs Bv(A) and Bv(S) representing the logarithmically compressed information of the brightness of an object to be photographed; SP1 and SP2 are photovoltaic type photoelectric transducer elements for generating currents proportional to the level of brightness of the object; OP11 and OP12 are operational amplifiers; and LDa and LDb are logarithmic conversion elements. The photo-currents from the SP1 and SP2 are produced in logarithmically compressed form through the OP11, OP12, LDa and LDb.

CT1 and CT2 are constant sources for temperature compensation having temperature response characteristics proportional to the absolute temperature, and cooperating with fixed resistors R51 and R52 and variable resistors VR1 and VR2 to produce reference voltages Vref1 and Vref2.

In general, the amount of light incident upon the photo-electric transducer element SP1 of the average measuring circuit is far larger than that of light incident upon the photo-electric transducer element SP2 of the spot measuring circuit. To compensate for this difference, the outputs Bv(A) and Bv(S) of the operational amplifiers OP11 and OP12 are balanced for the standard distribution of light on the object, the variable resistors VR1 and VR2 are adjusted (Vref1<Vref2),AG21 and AG22 are analog gates for selectively transferring the outputs Bv(A) and Bv(S) to the next stage of an exposure control circuit; SW31 is a memory switch opened at almost the same time when a quick return mirror M starts to flip upwards; C11 is a storage condenser; and BP11 is a buffer amplifier, the output of which is read by the ammeter MT to display an exposure value, in this instance, shutter time. The output of the buffer amplifier BP11 is processed through a transistor Tr11 for logarithmic expansion, a condenser for integration, a Schmit trigger circuit SM, and a magnet Mg controlling a shutter to recreate the actual time. A resistor R47 protects the transistor Tr11; SW32 is a count switch which opens at almost the same time when, for example, a leading circuit of the shutter starts to run down; SW33 is a main switch in the electrical circuitry; and E1 is an electrical power source or battery.

CA1 and CA2 are constant current sources having no temperature response characteristics and cooperating with resistors R43 to R46 to produce reference voltages Vref3 and Vref4, which are compared with the Bv(A) and Bv(S) by comparators CP5 and CP6. SW34 is a light measuring changeover means or switch having a position S for spot measuring and another position A for average measuring. R40 and R41 are pull-down resistors; IN11 in an inverter; AN41 to AN43 are AND gates; OR21 and OR22 are OR gates; OSC is an oscillator circuit; Tr12 and Tr13 are switching transistors;

LE1 and LE2 are light-emitting diodes for a warning display in the average and spot measuring modes; and R48 and R49 are current-limiting resistors for the light-emitting diodes.

The operation of the circuit of this construction is as follows: First, consideration is given to the situation where the changeover switch SW34 is in "A" position for the average measuring. When the main switch SW33 is closed, the positive terminal of the battery E1 is connected to the OR gates OR21 and OR22. Therefore, the OR gates OR21 and OR22 produce high level output signals, the high level signal from the OR gate OR21 turns on the analog gate AG41. On the basis of the output information Bv(A) of the operational amplifier OP11 as the output of the average measuring circuit LM1, exposure is controlled in a manner to be described later. Also, the output information Bv(A) of the operational amplifier OP11 is compared with the reference voltage Vref3 by the comparator CP5. When larger than the reference voltage Vref3, the comparator CP5 produces a high level output. This high level signal from the comparator CP5 is applied to the AND gate AN43 at one input. Since the opposite input of the AND gate AN43 is fed with the high level signal from the OR gate OR22, the AND gate AN43 then produces a high level output which is then applied to turn on the transistor Tr13. Thereby, the light-emitting LE1 is lighted continuously, thus preventing a display of an encircled letter "A", as illustrated in FIG. 18a, and informing the photographer that the selection of the average measuring mode is right for the given situation.

Figure 18B:
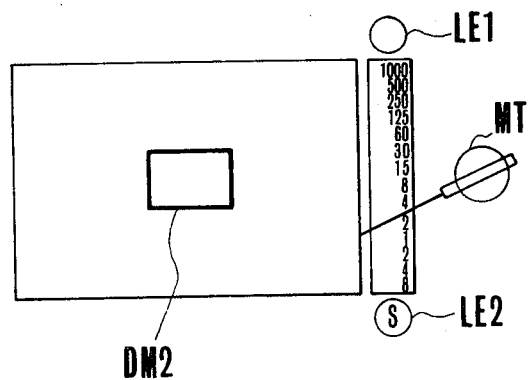

Explanation is given to another case where the spot measuring mode is selected by the changeover switch SW34. When the main switch SW33 is closed, the positive terminal of the battery E1 is connected to the AND gate AN41. Then, the output of the spot measuring circuit LM2 or the output information Bv(S) of the operational amplifier OP12 is compared with the reference voltage Vref4 by the comparators CP6. When larger than the reference voltage Vref4, the comparator CP6 produces a low level output. This low level signal from the operational comparator CP6, after having been inverted by the inverter IN21, is applied to the AND gate AN41, and the AND gate AN41 produces a high level output which is then applied to turn on both the analog gate AG21 and the transistor Tr12. As a result, while the exposure operation is controlled based on the output information of the operational amplifier OP12, an accurate measurement is being made in the spot measuring mode and is displayed by the energized light-emitting diode LE2 in the form of, for example, an encircled letter "S", as illustrated in FIG. 18b.

If the selection of the spot measuring mode is not right because the central part of the object is relatively dark, the output information Bv(S) of the operational amplifier OP12 is lower than the reference voltage. Then, the output of the comparator CP6 changes to high level. Therefore, since the input of the AND gate AN41 is supplied with the inverted output of the comparator CP6, the AND gate AN41 then produces a low level output which cannot turn on the analog gate AG22 and the transistor Tr12. Therefore, the light-emitting diode LE is no longer lighted and the spot reading is not used in the exposure control. However, such a change in the comparator CP6 to a high level output causes the analog gate AG21 to be turned on through the OR gate OR21. Thereby, the average measuring circuit LM1 is automatically selected to cooperate with the exposure control circuit. Also, the high level signal from the comparator CP6 is applied to the AND gate AN42. Therefore, the AND gate AN42 produces an oscillating output in response to the pulse train from the oscillator circuit OSC1. This oscillating output of the AND gate AN42 is applied through the OR gate OR22 and AND gate AN43 to the transistor Tr13, thereby the transistor Tr13 is turned on and off immediately. Thus, the display of "A" blinks to warn the photographer that the output of the spot measuring circuit has reached the measuring limit and automatically switches the camera to the average measuring mode.

Since, at this time, the signal level of the output information Bv(A) of the operational amplifier OP11 exceeds the reference voltage Vref3, the comparator CP5 produces a high level output, causing the output of the AND gate AN43 to oscillate in response to the oscillating output of the AND gate AN42. If the signal level of the output information Bv(A) of the operational amplifier OP5 falls below the reference voltage Vref3, however, the output of the comparator CP5 is changed to a low level, and the output of the AND gate AN43 also is changed to a low level, thereby the transistor Tr13 is rendered non-conducting. Thus, the warning display by the LE1 disappears, alternately indicating that the average measuring limit is reached.

Explanation is given to the manner in which the exposure operation is controlled. As either one of the analog gates AG21 and AG22 is selected to be turned on, the memory condenser is charged to a voltage proportional to the output information Bv(A) or Bv(S) of the average and spot measuring circuits. The start of an upward movement of the mirror M is almost immediately followed by turning off the memory switch SW31, and the voltage across the terminals of the memory condenser C11 is stored. The buffer amplifier BP11 produces an output proportional to the stored voltage on the condenser C11, and this output is applied to both the ammeter MT and transistor Tr11. Therefore, the exposure determination is reflected by the reading on the (ammeter) MT which is calibrated to indicate a shutter speed setting. When the leading curtain of the shutter starts to run down, the count switch SW32 is almost immediately turned off, and the condenser C12 is charged through the resistor R47 and transistor Tr11. Then, when the voltage on the condenser C12 reaches a predetermined level, the Schmit trigger circuit SM is inverted to actuate the magnet Mg, and the trailing curtain of the shutter runs down, thus terminating the exposure.

Thus, in the sixth embodiment of the invention, the light measuring system for single lens reflex cameras operates with the selection of the average measuring circuit of a wide angle view and the spot measuring circuit of a narrow angle view is provided with automatic selection control means. This renders it possible, despite the photographer's selection, for the spot measuring circuit to make narrow-angle readings of selected parts of the object, upon detection that the output of the spot measuring circuit falls below the measuring limit, to automatically change the selecton to the average measuring circuit. This has the advantage that while the camera is left switched to the spot measuring mode, proper exposures can be made even if the object to be photographed has a wide range of brighness, without recourse to any external control operation.

What is claimed is:

1. A light measuring system for a camera including:
   (a) 1st light measuring means for measuring the brightness of an object to be photographed in a predetermined area, said means producing an electrical signal representing the brightness of the predetermined area of the object;
   (b) 2nd light measuring means for measuring the brightness of the object in a different area from that for said 1st light measuring means,
      said means producing an electrical signal representing the brightness of the different area of the object from that for said 1st light measuring means;
   (c) measuring pattern setting means;
   (d) computing means responsive to the outputs of said 1st and said 2nd light measuring means,
      said means producing a 1st output representing a combination of the outputs of said 1st and said 2nd light measuring means in a certain adjusted relationship by said light measuring pattern setting means, and a 2nd output representing a combination of the outputs of said 1st and said 2nd light measuring means in a fixed relationship;
   (e) comparing means for comparing said 1st and said 2nd outputs of said computing means with each other,
      said means producing a 1st signal when the difference between the computed outputs is smaller than a predetermined value, and a 2nd signal when the difference between the computed outputs is larger than the predetermined value;
   (f) exposure control means for controlling exposure in accordance with either one of said 1st and 2nd computed outputs; and
   (g) control means for applying either one of said 1st and said 2nd computed outputs to said exposure control means,
      said means responsive to said 1st signal from said comparing means applying said 1st computed output to said exposure control means, and responsive to said 2nd signal from said comprising means applying said 2nd computed output to said exposure control means.

2. A light measuring system as described in claim 1, wherein said 1st light measuring circuit senses light on the whole area of a picture frame as in average measuring, and said 2nd light measuring circuit senses a central portion of the area of the picture frame as in spot measuring.

3. A light measuring system as described in claim 1, further including:
   measuring area display means for displaying the measuring pattern,
   said means presenting a display depending upon the set position of said light measuring pattern setting means.

4. A light measuring system as described in claim 3, wherein said light measuring area display means changes its display mode when said 2nd signal is applied.

5. A light measuring system as described in claim 3, wherein said light measuring area display means displays the selected area directly in the form of an outline block within the camera's viewfinder.

6. A light measuring system for a camera including:
   (a) 1st light measuring means for measuring the brightness of an object to be photographed in a predetermined area, said means producing an electrical signal representing the brightness of the predetermined area of the object;
   (b) 2nd light measuring means for measuring the brightness of the object in a different area from that for said 1st light measuring means,
      said means producing an electrical signal representing the brightness of the different area of the object from that for said 1st light measuring means;
   (c) measuring pattern setting means;
   (d) computing means responsive to the outputs of said 1st and said 2nd light measuring means,
      said means producing a 1st output representing a combination of the outputs of said 1st and said 2nd light measuring means in a certain adjusted relationship by said light measuring pattern setting means, and a 2nd output representing a combination of the outputs of said 1st and said 2nd light measuring means in a fixed relationship;
   (e) mode changeover means settable in any mode of a 1st mode and a 2nd mode, said means producing a 2nd signal when said 1st mode is selected, and either a 1st signal or the 2nd signal when said 2nd mode is selected, depending upon the difference between said 1st and said 2nd computed outputs smaller or larger than a predetermined value respectively;
   (f) exposure control means for controlling exposure in accordance with either one of said 1st and said 2nd computed outputs; and
   (g) control means for applying either one of said 1st and said 2nd computed outputs to said exposure control means,
      said means responsive to said 1st signal from said mode changeover means applying said 1st computed output to said exposure control means, and responsive to said 2nd signal from said mode changeover means applying said 2nd computed output to said exposure control means.

7. A light measuring system as described in claim 6, wherein said mode changeover means is settable in a 3rd mode, wherein when said 3rd mode is set, the 1st signal is produced.

8. A light measuring system as described in claim 6, wherein said mode changeover means is provided with warning display means, wherein when the difference between said 1st and said 2nd computed outputs is larger than the predetermined value a warning display is presented by said warning display means.

9. A light measuring system for a camera including:
   (a) 1st light measuring means for measuring the brightness of an object to be photographed in a predetermined area, said means producing an electrical signal representing the brightness of the predetermined area of the object;
   (b) 2nd light measuring means for measuring the brightness of the object in a different area from that for said 1st light measuring means,
      said means producing an electrical signal representing the brightness of the different area of the object from that for said 1st light measuring means;
   (c) computing means responsive to the outputs of said 1st and said 2nd light measuring means,
      said means producing an electrical signal representing the computed result;
   (d) 1st signal forming means for producing a 1st reference signal;

(e) 2nd signal forming means for producing a 2nd reference signal of different level from that of said 1st reference signal;

(f) exposure control means for controlling exposure in accordance with either one of the output signals of said 1st and said 2nd light measuring means and said computing means;

(g) control means for applying either one of the output signals of said 1st and said 2nd light measuring means and said computing means to said exposure control means, said means applying the output signal of said 2nd light measuring means to said exposure control means when the output signal of said 2nd light measuring means exceeds said 1st reference signal, applying the output of said computing means to said exposure control means when the output of said 2nd light measuring means does not exceed said 1st reference signal and when the output signal of said 1st light measuring means exceeds said 2nd reference signal, and applying the output signal of said 1st light measuring means to said exposure control means when the output signal of said light measuring means does not exceed said 2nd reference signal.

10. A light measuring system as described in claim 9, wherein said 1st light measuring circuit senses light on the whole area of a picture frame as in average measures, and said 2nd light measuring circuit senses a central portion of the area of the picture frame as in spot measuring.

11. A light measuring system as described in claim 9, wherein said control means has warning means wherein when the output signal of said 2nd light measuring means exceeds said 1st reference signal and when the output signal of said 1st light measuring means does not exceed said 2nd reference signal, said warning means is actuated.

12. A light measuring system comprising a 1st light measuring circuit having an average or centerweighted sensitivity pattern, a 2nd light measuring circuit having a spot-like sensitivity pattern, a computer circuit responsive to the outputs of said 1st and said 2nd light measuring circuits, an exposure control circuit for controlling exposure in accordance with the output of said computing circuit, a switching circuit for selection of an automatic exposure mode and a manual exposure mode, and a control circuit between the pair of said 1st and said 2nd light measuring circuits and a display circuit, wherein when a signal from said switching circuit is applied to said control circuit, said control circuit causes said display circuit to display the computed result of the outputs of said 1st and said 2nd light measuring circuits when in an automatic exposure mode, and to display the outputs of said 1st and said 2nd light measuring circuits alternately when in the manual exposure mode.

13. A light measuring system comprising:

(a) 1st light measuring means for measuring the brightness of an object to be photographed in a predetermined area, said means producing an electrical signal representing the brightness of the predetermined area of the object;

(b) 2nd light measuring means for measuring the brightness of the object in a different area from that for said 1st light measuring means, said means producing an electrical signal representing the brightness of the different area of the object from that for said 1st light measuring means;

(c) exposure control means for controlling exposure in accordance with either one of the output signals of said 1st and said 2nd light measuring means; and (d) changeover means for changing over said 1st light measuring means and said 2nd light measuring means, said means applying either one of the output signals of both said light measuring means to said exposure control means, said means also having control means for automatically changing over to said 1st light measuring means when said 2nd light measuring means has been selected and when the output of said 2nd light measuring means is fallen below a predetermined level.

* * * * *